US012794631B2

(12) United States Patent
Ryu et al.

(10) Patent No.: US 12,794,631 B2
(45) Date of Patent: Nov. 10, 2026

(54) REFERENCE SIGNAL CONFIGURATIONS FOR SIDELINK BEAM MAINTENANCE

(71) Applicant: QUALCOMM Incorporated, San Diego, CA (US)

(72) Inventors: Jae Ho Ryu, San Diego, CA (US); Kazuki Takeda, Minato-ku (JP); Hari Sankar, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 294 days.

(21) Appl. No.: 18/421,181

(22) Filed: Jan. 24, 2024

(65) Prior Publication Data

US 2025/0240141 A1 Jul. 24, 2025

(51) Int. Cl.
*H04L 5/00* (2006.01)

(52) U.S. Cl.
CPC .................................. *H04L 5/0051* (2013.01)

(58) Field of Classification Search
CPC ... H04L 5/0051; H04B 7/06954; H04W 92/18
See application file for complete search history.

(56) References Cited

U.S. PATENT DOCUMENTS

2020/0314804 A1* 10/2020 Shin ...................... H04L 5/0055

FOREIGN PATENT DOCUMENTS

| | | |
|---|---|---|
| CN | 111181710 A | 5/2020 |
| CN | 11118170 A * | 5/2025 |
| WO | WO-2023081139 A1 | 5/2023 |

OTHER PUBLICATIONS

International Search Report and Written Opinion—PCT/US2025/010296—ISA/EPO—Mar. 19, 2025.

LG Electronics: "Discussion on Physical Layer Structure for NR Sidelink", 3GPP TSG RAN WG1 Meeting #100bis, R1-2001884, 3rd Generation Partnership Project, Mobile Competence Centre, 650, Route Des Lucioles, F-06921, Sophia-Antipolis Cedex, France, vol. RAN WG1, No. Online Meeting, Apr. 20, 2020-Apr. 30, 2020, Apr. 11, 2020, 53 Pages, XP051875320, Section "2.1.8. Sidelink CSI-RS design"; p. 21.

Moderator (Apple): "FL Summary #1 for AI 9.4.3 Enhanced Sidelink Operation on FR2 Licensed Spectrum", 3GPP TSG RAN WG1 #113, R1-2306017, 3rd Generation Partnership Project, Mobile Competence Centre, 650, Route Des Lucioles, F-06921, Sophia-Antipolis Cedex, France, vol. 3GPP RAN 1, No. Incheon, Korea, May 22, 2023-May 26, 2023, May 22, 2023, pp. 1-111, XP052483633, ZTE proposal 11; p. 57.

(Continued)

*Primary Examiner* — Christopher M Brandt
(74) *Attorney, Agent, or Firm* — HOLLAND & HART LLP

(57) ABSTRACT

Methods, systems, and devices for wireless communications are described. A user equipment (UE) may receive control signaling indicating a sidelink channel state information (CSI) reference signal (CSI-RS) configuration. The UE may transmit, in accordance with the sidelink CSI-RS configuration and a sidelink beam management procedure, a sidelink CSI-RS within a slot over a sidelink shared channel. The UE may communicate with a second UE over the sidelink shared channel in accordance with a result of the sidelink beam management procedure that is based on transmitting the sidelink CSI-RS.

19 Claims, 15 Drawing Sheets

(56) References Cited

OTHER PUBLICATIONS

Samsung: "On Physical Layer Procedures for NR V2X", 3GPP TSG RAN WG1 #99, R1-1912464, 3rd Generation Partnership Project, Mobile Competence Centre, 650, Route Des Lucioles, F-06921, Sophia-Antipolis Cedex, France, vol. RAN WG1, No. Reno, USA, Nov. 18, 2019-Nov. 22, 2019, Nov. 8, 2019, 15 Pages, XP051820049, Section "5.4 Power Control for SL CSI-RS and SL PTRS"; p. 12.

* cited by examiner

REFERENCE SIGNAL CONFIGURATIONS FOR SIDELINK BEAM MAINTENANCE

FIELD OF TECHNOLOGY

The following relates to wireless communications, including reference signal configurations for sidelink beam maintenance.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications systems, a wireless device may perform a beam maintenance procedure in sidelink operation. However, such approaches may be improved.

SUMMARY

The described techniques relate to improved methods, systems, devices, and apparatuses that support reference signal configurations for sidelink beam maintenance. For example, a user equipment (UE) may receive control signaling indicating a sidelink channel state information (CSI) reference signal (CSI-RS) configuration. The UE may transmit, in accordance with the sidelink CSI-RS configuration and a sidelink beam management procedure, a sidelink CSI-RS within a slot over a sidelink shared channel. The UE may communicate with a second UE over the sidelink shared channel in accordance with a result of the sidelink beam management procedure that is based on transmitting the sidelink CSI-RS.

A method for wireless communications by a first user equipment (UE) is described. The method may include receiving control signaling indicating a sidelink channel state information (CSI) reference signal (CSI-RS) configuration, transmitting, in accordance with the sidelink CSI-RS configuration and a sidelink beam management procedure, a sidelink CSI-RS within a slot over a sidelink shared channel, and communicating with a second UE over the sidelink shared channel in accordance with a result of the sidelink beam management procedure that is based on transmitting the sidelink CSI-RS.

A first UE for wireless communications is described. The first UE may include one or more memories storing processor executable code, and one or more processors coupled with the one or more memories. The one or more processors may individually or collectively be operable to execute the code to cause the first UE to receive control signaling indicating a sidelink CSI reference signal (CSI-RS) configuration, transmit, in accordance with the sidelink CSI-RS configuration and a sidelink beam management procedure, a sidelink CSI-RS within a slot over a sidelink shared channel, and communicate with a second UE over the sidelink shared channel in accordance with a result of the sidelink beam management procedure that is based on transmitting the sidelink CSI-RS.

Another first UE for wireless communications is described. The first UE may include means for receiving control signaling indicating a sidelink CSI reference signal (CSI-RS) configuration, means for transmitting, in accordance with the sidelink CSI-RS configuration and a sidelink beam management procedure, a sidelink CSI-RS within a slot over a sidelink shared channel, and means for communicating with a second UE over the sidelink shared channel in accordance with a result of the sidelink beam management procedure that is based on transmitting the sidelink CSI-RS.

A non-transitory computer-readable medium storing code for wireless communications is described. The code may include instructions executable by one or more processors to receive control signaling indicating a sidelink CSI reference signal (CSI-RS) configuration, transmit, in accordance with the sidelink CSI-RS configuration and a sidelink beam management procedure, a sidelink CSI-RS within a slot over a sidelink shared channel, and communicate with a second UE over the sidelink shared channel in accordance with a result of the sidelink beam management procedure that is based on transmitting the sidelink CSI-RS.

In some examples of the method, first user equipment (UEs), and non-transitory computer-readable medium described herein, transmitting the sidelink CSI-RS may include operations, features, means, or instructions for transmitting, in accordance with the sidelink CSI-RS configuration, the sidelink CSI-RS over a set of multiple last consecutive symbols of the slot that precede a gap symbol, and do not overlap with one or more symbols scheduled for demodulation reference signal (DMRS) transmissions and one or more symbols scheduled for CSI measurement operations.

In some examples of the method, first user equipment (UEs), and non-transitory computer-readable medium described herein, transmitting the sidelink CSI-RS may include operations, features, means, or instructions for transmitting, in accordance with the sidelink CSI-RS configuration, the sidelink CSI-RS over a set of multiple non-consecutive symbols of the slot that do not overlap with one or more symbols scheduled for DMRS transmissions and one or more symbols scheduled for CSI measurement operations.

Some examples of the method, first user equipment (UEs), and non-transitory computer-readable medium described herein may further include operations, features, means, or instructions for receiving an indication of a symbol of the slot that may be to be a first symbol of the set of multiple non-consecutive symbols and where transmitting the sidelink CSI-RS further includes transmitting the sidelink CSI-RS in accordance with the indication of the first symbol of the set of multiple non-consecutive symbols.

Some examples of the method, first user equipment (UEs), and non-transitory computer-readable medium described herein may further include operations, features, means, or instructions for receiving an indication of a quantity of symbols for transmitting the sidelink CSI-RS, where transmitting the sidelink CSI-RS may be based on receiving the indication.

In some examples of the method, first user equipment (UEs), and non-transitory computer-readable medium described herein, transmitting the sidelink CSI-RS may include operations, features, means, or instructions for transmitting, in accordance with the sidelink CSI-RS configuration, the sidelink CSI-RS over a set of multiple consecutive symbols of the slot that immediately precede a gap symbol, where one or more symbols for sidelink shared channel DMRS transmissions may be determined based on one or more sidelink shared channel transmissions on symbols excluding the set of multiple consecutive symbols for sidelink CSI-RS transmission.

In some examples of the method, first user equipment (UEs), and non-transitory computer-readable medium described herein, transmitting the sidelink CSI-RS may include operations, features, means, or instructions for transmitting the sidelink CSI-RS using a same transmit beam used for transmitting sidelink control channel transmissions, sidelink shared channel transmissions, or both.

In some examples of the method, first user equipment (UEs), and non-transitory computer-readable medium described herein, transmitting the sidelink CSI-RS may include operations, features, means, or instructions for transmitting the sidelink CSI-RS using a transmit beam different than transmit beams used for transmitting sidelink control channel transmissions, sidelink shared channel transmissions, or both.

In some examples of the method, first user equipment (UEs), and non-transitory computer-readable medium described herein, a bandwidth of the sidelink CSI-RS may be a same bandwidth as a bandwidth of sidelink shared channel information transmitted in the slot.

Some examples of the method, first user equipment (UEs), and non-transitory computer-readable medium described herein may further include operations, features, means, or instructions for excluding, within symbols in which the sidelink CSI-RS may be transmitted, transmission of information other than the sidelink CSI-RS.

In some examples of the method, first user equipment (UEs), and non-transitory computer-readable medium described herein, transmitting the sidelink CSI-RS may include operations, features, means, or instructions for transmitting the sidelink CSI-RS with a transmit power that corresponds to one or more transmit powers associated with symbols other than those in which the sidelink CSI-RS may be transmitted.

Some examples of the method, first user equipment (UEs), and non-transitory computer-readable medium described herein may further include operations, features, means, or instructions for transmitting, within the slot, control information indicating that the first UE may be to transmit the sidelink CSI-RS in the slot.

Some examples of the method, first user equipment (UEs), and non-transitory computer-readable medium described herein may further include operations, features, means, or instructions for transmitting, in a previous slot occurring earlier in time than the slot, control information indicating that the first UE may be to transmit the sidelink CSI-RS in the slot.

In some examples of the method, first user equipment (UEs), and non-transitory computer-readable medium described herein, the previous slot and the slot correspond to a same aperiodic resource reservation group.

Some examples of the method, first user equipment (UEs), and non-transitory computer-readable medium described herein may further include operations, features, means, or instructions for receiving, in accordance with the sidelink beam management procedure, a request to transmit the sidelink CSI-RS, where transmitting the sidelink CSI-RS may be based on receiving the request.

Some examples of the method, first user equipment (UEs), and non-transitory computer-readable medium described herein may further include operations, features, means, or instructions for receiving, in accordance with the sidelink beam management procedure, a report indicating one or more signal quality indications associated with the sidelink CSI-RS and determining, in accordance with the sidelink beam management procedure and the report, one or more beams to be used for communications with the second UE, where communicating with the second UE may be based on the determined one or more beams.

DETAILED DESCRIPTION

In wireless communications, a user equipment (UE) may operate in sidelink (SL) communications with another UE. Such SL UEs may transmit reference signals, such as a channel state information reference signal (CSI-RS) for beam maintenance purposes. Further, such UEs may operate in different frequency bands, including an FR2 or mmWave frequency band. However, in some approaches, the use of CSI-RS transmissions in such frequency bands has not been defined and interactions between UEs may become ambiguous as a result, such as considering scheduling of CSI-RS transmissions in light of demodulation reference signal (DMRS) transmissions in a same slot.

Techniques for CSI-RS transmission for beam maintenance may be employed. For example, symbols for CSI-RS transmission within a slot may be configured to be a quantity of consecutive or non-consecutive symbols that occur latest in a slot (e.g., a last quantity of M symbols). In some examples, such symbols for CSI-RS may not overlap with symbols assigned for other purposes (e.g., sidelink control channel transmissions, sidelink shared channel DMRS transmissions, sidelink feedback channel transmissions, gap symbols, symbols for CSI-RS transmission for channel state information (CSI) measurement, or any combination thereof). Additionally, or alternatively, the quantity of consecutive or non-consecutive symbols may be configured without regard to configuration of symbols assigned for other purposes (e.g., those symbols assigned for sidelink shared channel DMRS transmissions). For example, symbols for CSI-RS transmissions may be determined before determining symbol assignments or allocations for DMRS transmissions. In this way, configurations for sidelink CSI-RS transmissions, including those in an FR2 frequency band, may be utilized to reduce ambiguity in sidelink operations, thereby providing improved communications quality, improved communications reliability, improved resource utilizations, reduced latency, and reduced errors in operation.

Aspects of the disclosure are initially described in the context of wireless communications systems. Aspects of the disclosure are then described with reference to a wireless communications system, reference signal schemes, and a process flow. Aspects of the disclosure are further illustrated by and described with reference to apparatus diagrams, system diagrams, and flowcharts that relate to reference signal configurations for sidelink beam maintenance.

Figure 1:
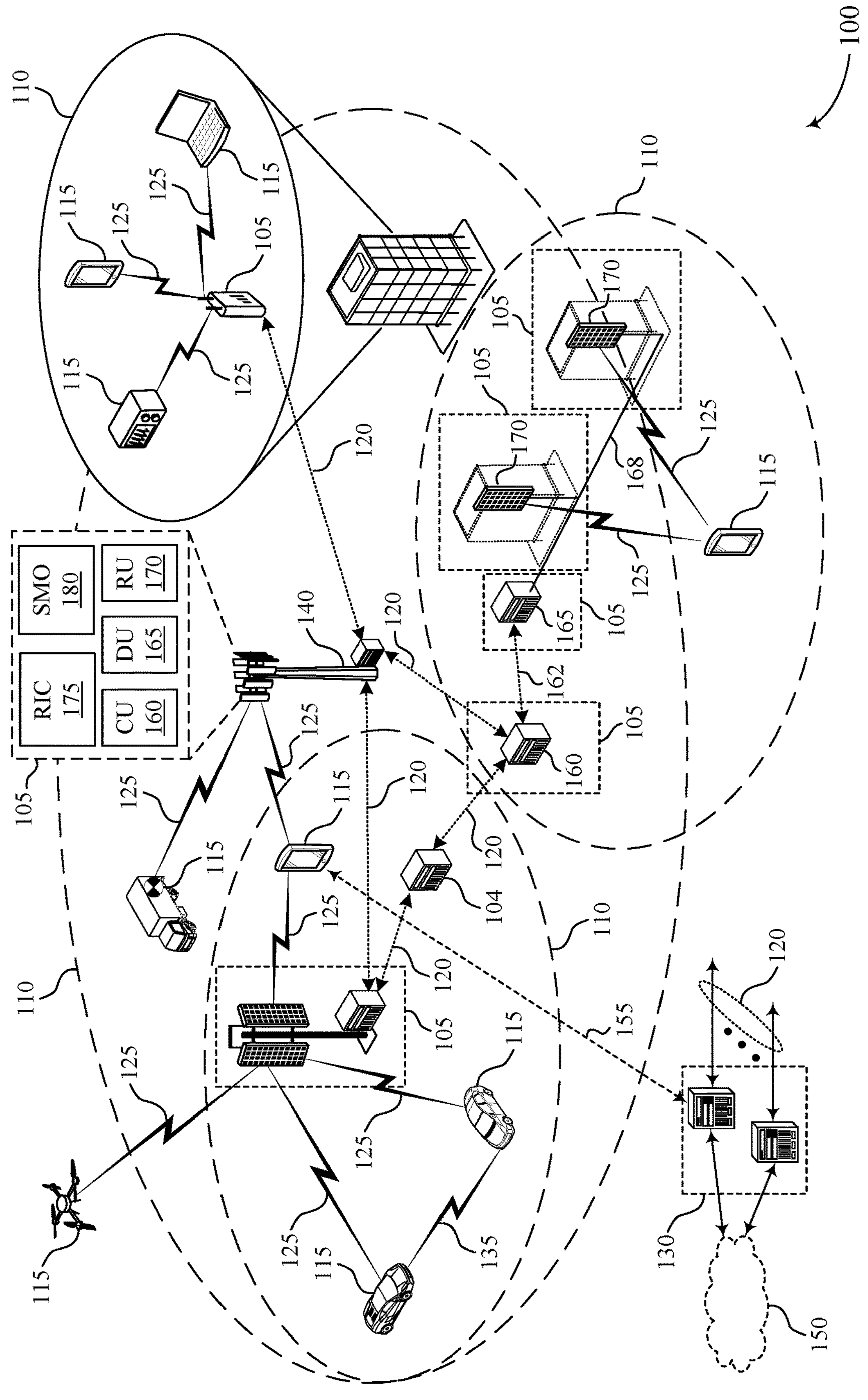
FIG. 1 shows an example of a wireless communications system that supports reference signal configurations for sidelink beam maintenance.

FIG. 1 shows an example of a wireless communications system 100 that supports reference signal configurations for sidelink beam maintenance. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-*c*, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support reference signal configurations for sidelink beam maintenance as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (e.g., a CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some implementations or examples, multiple UEs 115 operating in sidelink may employ techniques for beam maintenance and transmission of CSI-RSs. For example, a first UE 115 may transmit one or more CSI-RSs to a second UE 115 in accordance with a beam management procedure (e.g., an implicit beam management procedure or an explicit beam management procedure, as described herein). In some examples, the first UE 115 may transmit the one or more CSI-RSs as to not interfere with scheduling of DMRS transmissions or other transmissions previously scheduled as described in other approaches (e.g., legacy operation). For example, the first UE 115 may transmit the CSI-RSs on last consecutive or non-consecutive symbols that do not interfere with DMRS transmissions scheduled under a legacy scheme. Additionally, or alternatively, the first UE 115 may transmit the CSI-RSs without regard to any legacy schemes, and DMRSs may be scheduled in symbols not associated with the CSI-RS transmissions (again either in consecutive or non-consecutive slots).

Figure 2:
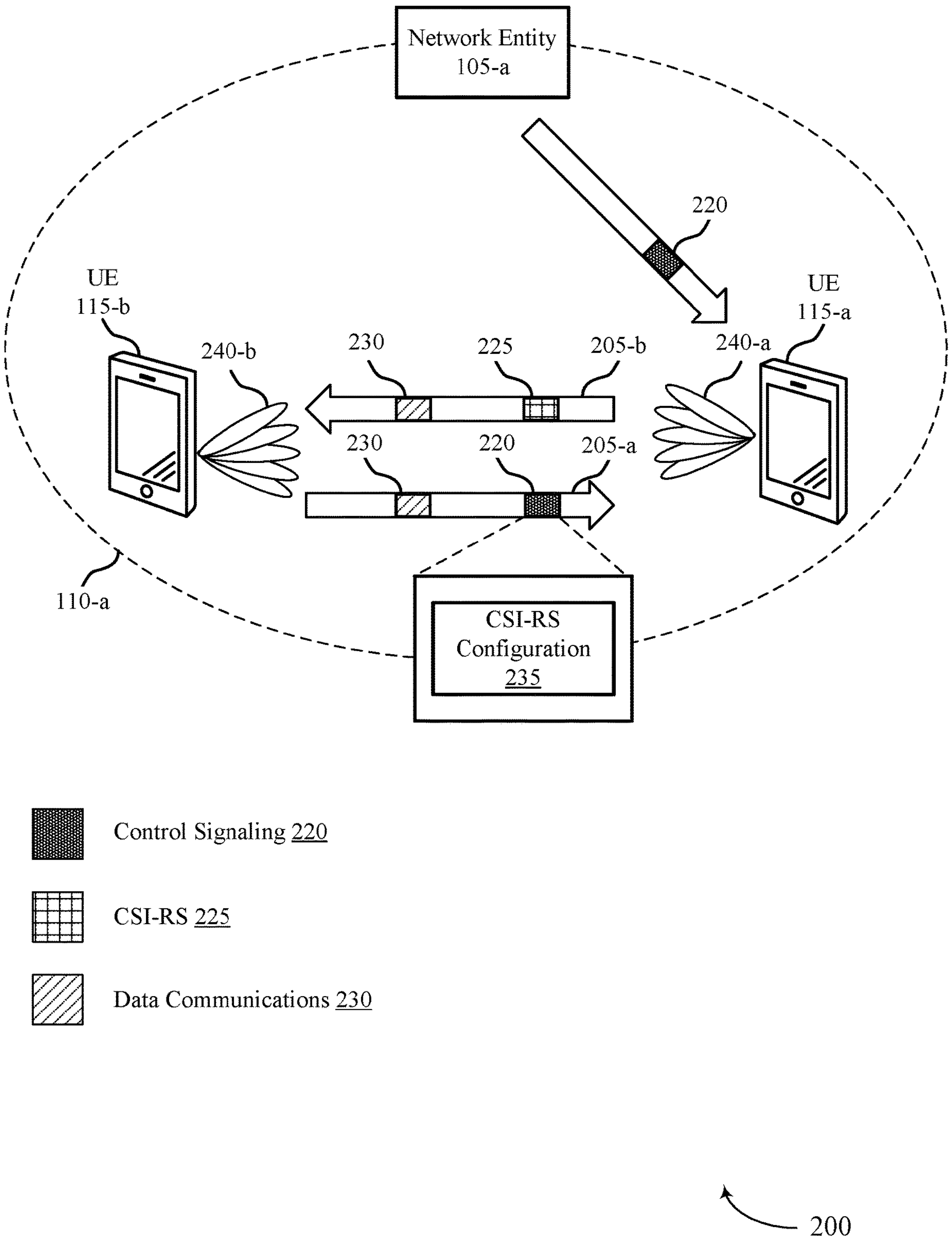
FIG. 2 shows an example of a wireless communications system that supports reference signal configurations for sidelink beam maintenance.

FIG. 2 shows an example of a wireless communications system 200 that supports reference signal configurations for sidelink beam maintenance. In some examples, of wireless communication, a UE 115-*a* and a UE 115-*b* may communicate via sidelink communications (e.g., sidelink 205-*a* and sidelink 205-*b*). In some examples, one or both of the UE 115-*a* and the UE 115-*b* may be located in a geographic coverage area 110-*a* associated with a network entity 105-*a*, and one or both of the UE 115-*a* and the UE 115-*b* may communicate with the network entity 105-*a* via one or more uplinks and downlinks.

In some examples, a sidelink slot may include 14 symbols (e.g., OFDMA symbols). In some examples, a first symbol of a slot may be a repeated symbol (e.g., a repeat of a preceding symbol) that may be used for automatic gain control (AGC) purposes (e.g., as a reference by which AGC may be tuned, refined, adjusted, or modified). In some examples, a gap symbol may be included in the slot after one or more shared channel symbols (e.g., physical sidelink shared channel (PSSCH) symbols). In some examples, physical sidelink control channel (PSCCH) transmissions, PSSCH transmissions, or both may be transmitted within the slot. In some examples, physical sidelink feedback channel (PSFCH) transmissions may occur in the slot (e.g., in one or more of the last two symbols in a slot before a gap symbol).

In some examples of sidelink operation, the UE 115-*a* may transmit a CSI-RS 225 in response to a channel state feedback (CSF) measurement being triggered by a CSI request field in control signaling, such as the control signaling 220 (e.g., which may be an example of sidelink control information (SCI)). In some examples, one or two ports (or another quantity of ports) may be employed for transmission (e.g., based on a PC5-RRC configuration, such as found in a configuration parameter, such as SL-CSI-RS-Config-r16). In some examples, the CSI-RS 225 may be transmitted with a same power as a reference signal transmission (e.g., a DMRS transmission). In some examples, the CSI-RS 225 may be frequency division multiplexed with one or more sidelink shared channel tones in a same symbol.

In some examples, the UE 115-*a* and the UE 115-*b* may perform an implicit beam management or maintenance procedure. Such an implicit beam maintenance procedure may involve receiver-autonomous beam refinement. For example, the UE 115-*b* may request that the UE 115-*a* transmit multiple CSI-RSs 225 with a fixed beam, such as one of the beams 240-*a* (e.g., using beam repetition). The UE 115-*a* may transmit the CSI-RSs 225 using a beam of the beams 240-*a* (e.g., using beam repetition). In some examples, the UE 115-*b* may measure multiple CSI-RS resources using a receiver beam sweep (e.g., sweeping the beams 240-*b*) to refine the receive beam used by the UE 115-*b*. In some examples, the UE 115-*b* may use the receive beam selected or refined for transmissions to the UE 115-*a* (e.g., using beam correspondence). In some examples, a similar procedure may be used to refine the transmit beams, receive beams, or both of the UE 115-*a* in which the UE 115-*b* may transmit multiple CSI-RSs and the UE 115-*a* may sweep the beams 240-*a* to determine or refine one or more of the beams 240-*a* to use for communications.

In some examples, the UE 115-*a* and the UE 115-*b* may perform an explicit beam management or maintenance procedure. Such an explicit beam maintenance procedure may involve signal quality reporting (e.g., reference signal received power (RSRP) reporting, signal to interference and noise ratio (SINR) reporting, or any combination thereof). For example, the UE 115-*a* may transmit multiple CSI-RSs 225 resources with transmit beam sweeping (e.g., sweeping the beams 240-*a*). The UE 115-*b* measures signal quality (e.g., RSRP or SINR) for each of the CSI-RSs 225 and reports one or more results (e.g., one or more top results) to the UE 115-*a*. The UE 115-*a* determines, selects, or refines one or more transmit beams (e.g., of the beams 240-*a*) to use and indicates the decision (e.g., via a transmission configuration indication (TCI) field to the UE 115-*b*. If the UE 115-*a* supports beam correspondence, the UE 115-*a* can also determine, select, or refine one or more receive beams (e.g., of the beams 240-*a*) based on the transmit beam or beams. The UE 115-*b* may determine, select, or refine one or more receive beams for communication with the UE 115-*a* (e.g., based on the TCI indication). If the UE 115-*b* supports beam correspondence, the UE 115-*b* may determine one or more transmit beams (e.g., of the beams 240-*b*) based on the determined, selected, or refined beam or beams.

In some examples, the UE 115-*a*, the UE 115-*b*, the network entity 105-*a*, or any combination thereof, may determine time domain locations (e.g., one or more symbols) in which the UE 115-*a*, the UE 115-*b*, or both, are to transmit one or more DMRSs. In some examples, two, three, or four DMRS symbols are specified to enable frequency offset and Doppler spread estimation at a receiving device.

However, in some approaches, sidelink CSI-RS 225 transmissions may remain ambiguous. For example, in some approaches, ambiguity may be present in considering whether a single or multiple CSI-RSs 225 are to be transmitted, whether a same or different transmission beams (e.g., as compared to sidelink control channel or sidelink shared channel transmissions) are used for the CSI-RSs 225, details regarding resource configuration, control channel indications (e.g., SCI indications), or any combination thereof.

Thus, to reduce or eliminate such ambiguity, improve communications quality and reliability, reduce waste of communications resources, or any combination thereof, the UE 115-*a* and the UE 115-*b* may engage in communication of CSI-RSs 225 in accordance with a beam refinement procedure. For example, the UE 115-*a* may receive the control signaling 220 (e.g., from the UE 115-*b* or the network entity 105-*a*), which may indicate the CSI-RS configuration 235. The UE 115-*a* may transmit the CSI-RS 225 (e.g., a sidelink CSI-RS) in accordance with the CSI-RS configuration 235, a sidelink beam management procedure, or any combination thereof. The UE 115-*a* and the UE 115-*b* may receive, determine, or otherwise obtain one or more results of the sidelink beam management procedure, and may communicate the data communications 230 over a sidelink shared channel in accordance with the sidelink beam management procedure.

FIGS. 3A, 3B, 3C, and 3D show examples of reference signal scheme 300, reference signal scheme 301, reference signal scheme 302, and reference signal scheme 303 that support reference signal configurations for sidelink beam maintenance. In some examples, the UE 115-*a* and the UE 115-*b* may communicate in accordance with the reference signal scheme 300, the reference signal scheme 301, the reference signal scheme 302, the reference signal scheme 303, or any combination thereof, and in accordance with the techniques described herein.

In some cases, in which a resource pool may support sensing-based resource selection, such as for legacy devices, such legacy devices my measure PSSCH RSRP from PSSCH DMRS transmissions. In such cases, the slot structure may include symbols determined to include DMRS as in other approaches.

Figure 3A:
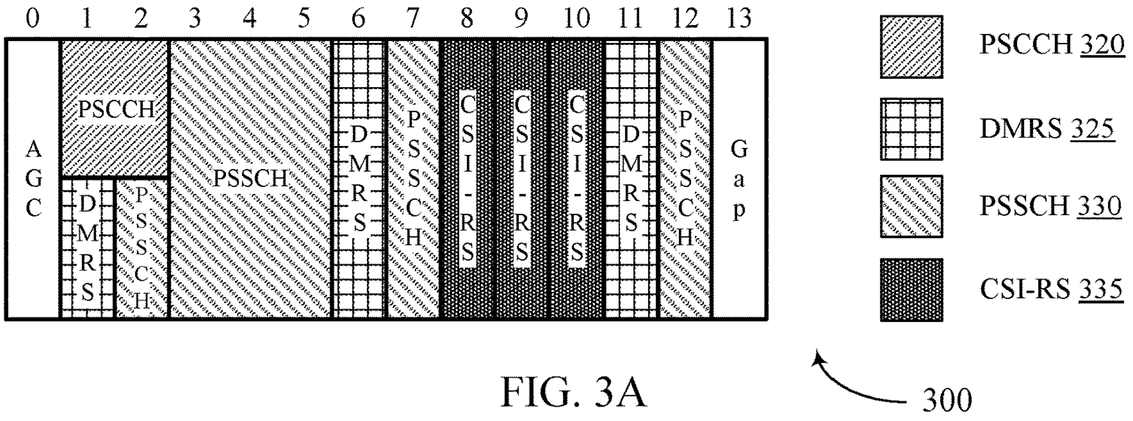
FIGS. 3A, 3B, 3C, and 3D show examples of reference signal schemes that support reference signal configurations for sidelink beam maintenance.

In FIG. 3A, the reference signal scheme 300 may include one or more symbols for PSCCH 320, one or more symbols for DMRS 325, one or more symbols for PSSCH 330, and one or more symbols for CSI-RS 335. Reference signal scheme 300 depicts a slot with symbols 0 through 13. Here, the DMRS 425 symbols may be configured or scheduled in accordance with sensing-based resource selection approaches.

In some examples, the CSI-RS 335 may be transmitted on M consecutive symbols. For example, as shown in the reference signal scheme 300, the CSI-RS may be transmitted on symbols 8, 9, and 10. In some examples, the quantity of symbols (e.g., represented by M) may be configured or preconfigured for a resource pool. In some examples, the last consecutive M symbols that do not overlap with PSCCH 320 symbols, PSSCH DMRS 325 symbols, PSFCH 340 symbols, gap symbols, CSI-RS transmissions for CSI measurement, or any combination thereof, are selected for transmission of the CSI-RS 335 for beam management.

Figure 3B:
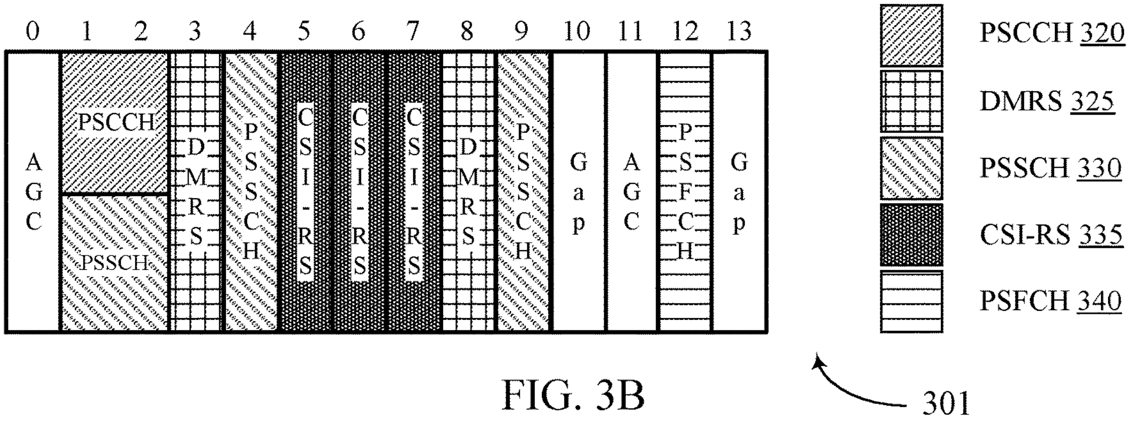

FIG. 3B shows an alternative arrangement of symbols in the slot, in which the CSI-RSs 335 are transmitted on symbols 5, 6, and 7 of the slot. However, in this example, the CSI-RSs 335 are still transmitted on the last consecutive M symbols that do not overlap with PSCCH 320 symbols, PSSCH DMRS 325 symbols, PSFCH 340 symbols, gap symbols, CSI-RS transmissions for CSI measurement, or any combination thereof. Here, the DMRS 425 symbols may be configured or scheduled in accordance with sensing-based resource selection approaches.

Figure 3C:
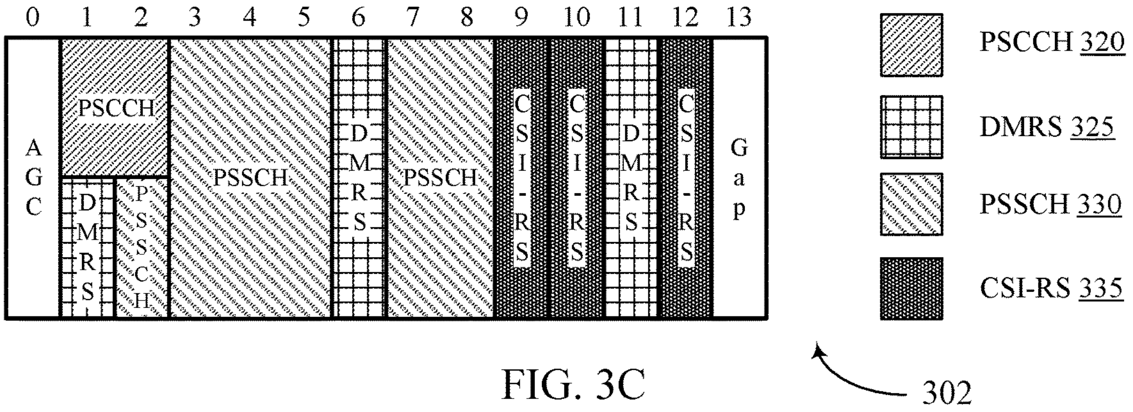

In FIG. 3C, the reference signal scheme 302 may include one or more symbols for PSCCH 320, one or more symbols for DMRS 325, one or more symbols for PSSCH 330, one or more symbols for CSI-RS 335, and one or more symbols for PSFCH 340. Reference signal scheme 302 depicts a slot with symbols 0 through 13. Here, the DMRS 425 symbols may be configured or scheduled in accordance with sensing-based resource selection approaches. As such, the DMRS 425 may be scheduled in the midst of the CSI-RS 335 such that the CSI-RSs 335 are transmitted over non-consecutive slots.

In some examples, the CSI-RS 335 may be transmitted on the last M non-consecutive symbols. For example, as shown in the reference signal scheme 302, the CSI-RS may be transmitted on symbols 9, 10, and 12. In some examples, the quantity of symbols (e.g., represented by M), a starting symbol (e.g., represented by S), or any combination thereof, may be configured or preconfigured for a resource pool. In some examples, a same transmit beam may be used for the M symbols (e.g., in association with an implicit beam maintenance scheme as described herein). In some examples, the last non-consecutive M symbols that do not overlap with PSCCH 320 symbols, PSSCH DMRS 325 symbols, PSFCH 340 symbols, gap symbols, CSI-RS transmissions for CSI measurement, or any combination thereof, are selected for transmission of the CSI-RS 335 for beam management.

Figure 3D:
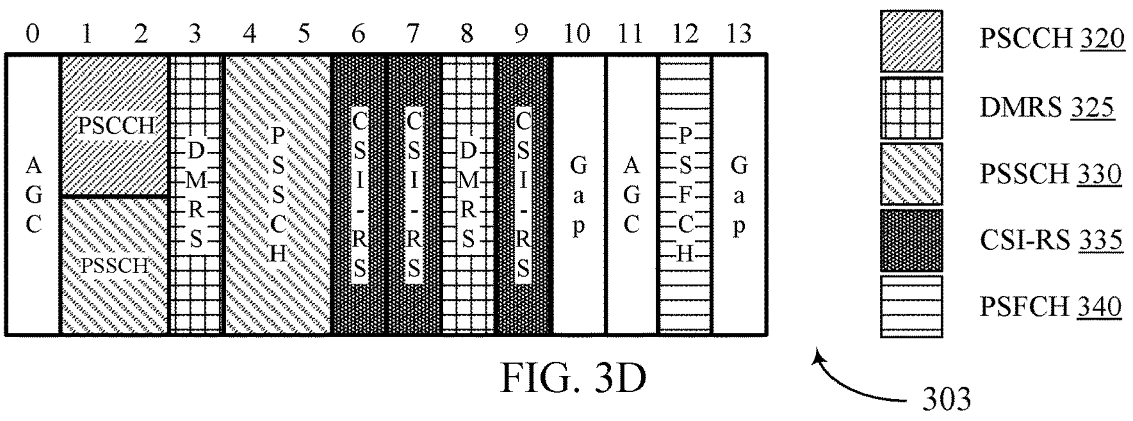

FIG. 3D shows an alternative arrangement of symbols in the slot, in which the CSI-RSs 335 are transmitted on symbols 6, 7, and 9 of the slot. However, in this example, the CSI-RSs 335 are still transmitted on the last non-consecutive M symbols that do not overlap with PSCCH 320 symbols, PSSCH DMRS 325 symbols, PSFCH 340 symbols, gap symbols, CSI-RS transmissions for CSI measurement, or any combination thereof. Here, the DMRS 425 symbols may be configured or scheduled in accordance with sensing-based resource selection approaches. As such, the DMRS 425 may be scheduled in the midst of the CSI-RS 335 such that the CSI-RSs 335 are transmitted over non-consecutive slots.

Figure 4A:
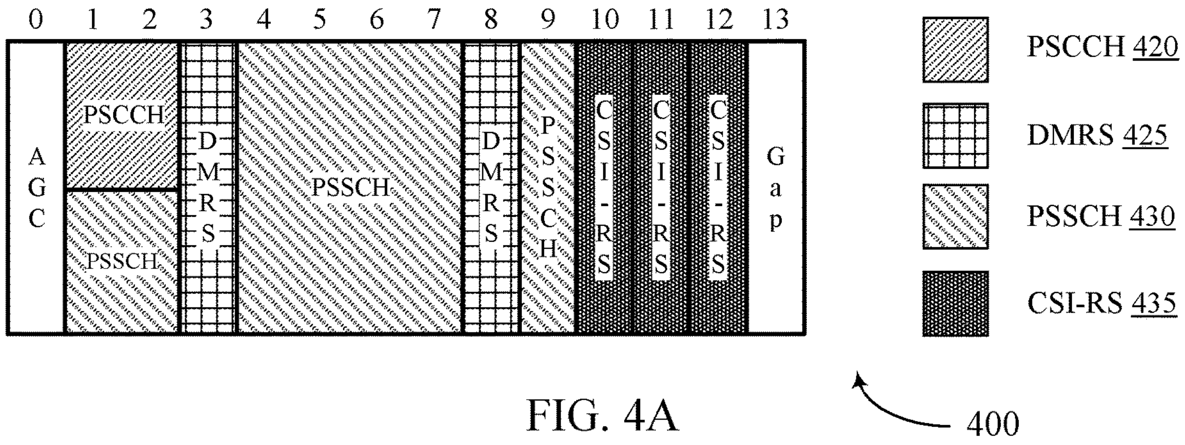
FIGS. 4A and 4B show examples of reference signal schemes that support reference signal configurations for sidelink beam maintenance.
Figure 4B:
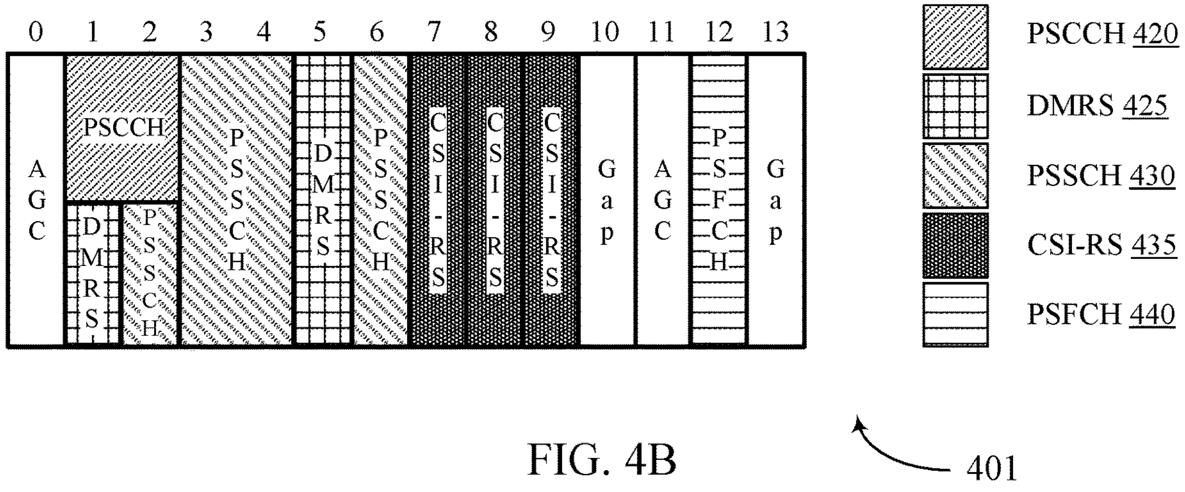

FIGS. 4A and 4B show examples of reference signal scheme 400 and reference signal scheme 401 that support reference signal configurations for sidelink beam maintenance. In some examples, the UE 115-*a* and the UE 115-*b* may communicate in accordance with the reference signal scheme 400, the reference signal scheme 401, or any combination thereof, and in accordance with the techniques described herein.

In some examples, in which a resource pool does not support sensing-based resource selection, such as for legacy devices, the sidelink slot structure may be different (e.g., in terms of DMRS location(s) within a slot).

In FIG. 4A, the reference signal scheme 400 may include one or more symbols for PSCCH 420, one or more symbols for DMRS 425, one or more symbols for PSSCH 430, and one or more symbols for CSI-RS 435. Reference signal scheme 400 depicts a slot with symbols 0 through 13. Here, the DMRS 425 symbols may not be configured or scheduled in accordance with sensing-based resource selection approaches.

In some examples, the CSI-RS 435 may be transmitted on M consecutive symbols. For example, as shown in the reference signal scheme 400, the CSI-RS may be transmitted on symbols 10, 11, and 12. In some examples, the quantity of symbols (e.g., represented by M) may be configured or preconfigured for a resource pool. In some examples, the last consecutive M symbols before a gap symbol are selected for transmission of the CSI-RS 435 for beam management.

FIG. 4B shows an alternative arrangement of symbols in the slot, in which the CSI-RSs 435 are transmitted on symbols 7, 8, and 9 of the slot (e.g., due to the inclusion of the PSFCH 440 transmission in the slot). However, in this example, the CSI-RSs 435 are still transmitted on the last consecutive M symbols before a gap symbol.

Figure 5A:
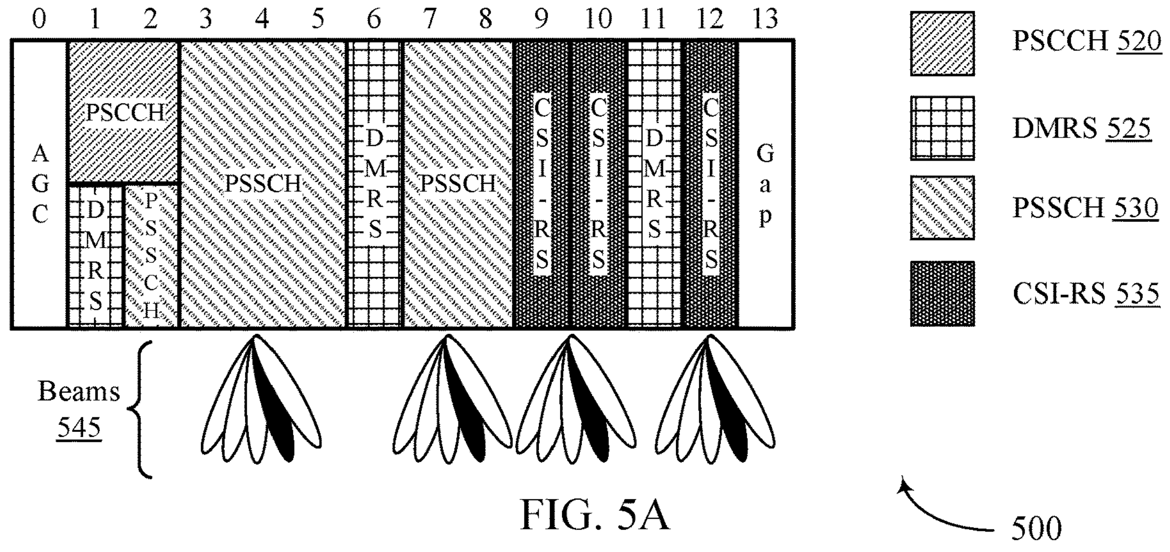
FIGS. 5A, 5B, and 5C show examples of reference signal schemes that support reference signal configurations for sidelink beam maintenance.
Figure 5B:
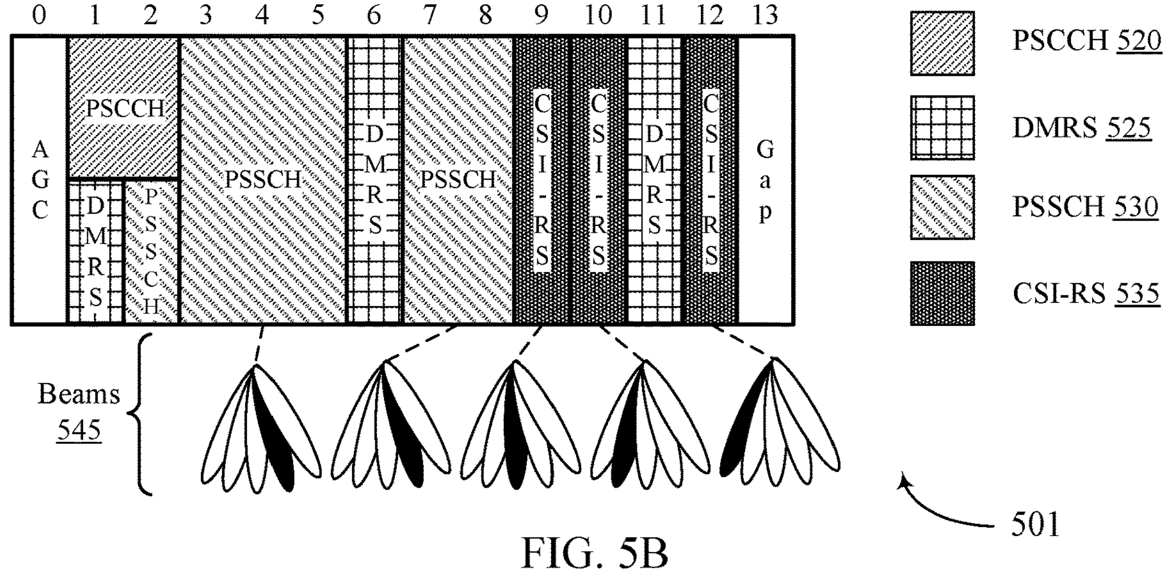
Figure 5C:
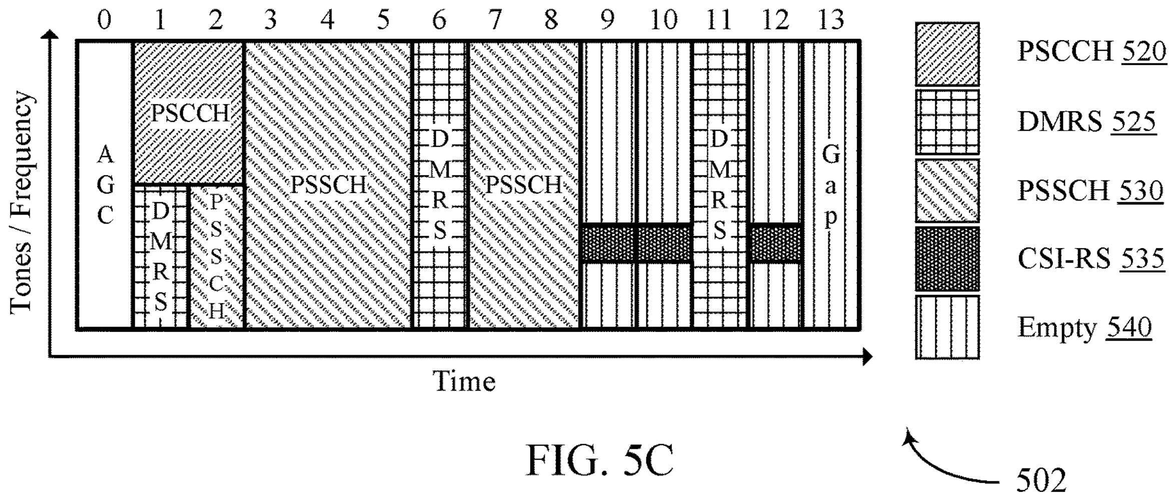

FIGS. 5A, 5B, and 5C show examples of reference signal scheme 500, reference signal scheme 501, and reference signal scheme 502 that support reference signal configurations for sidelink beam maintenance. In some examples, the UE 115-*a* and the UE 115-*b* may communicate in accordance with the reference signal scheme 500, the reference signal scheme 501, the reference signal scheme 502, or any combination thereof, and in accordance with the techniques described herein.

In FIG. 5A, the reference signal scheme 500 may include one or more symbols for PSCCH 520, one or more symbols for DMRS 525, one or more symbols for PSSCH 530, and one or more symbols for CSI-RS 535. Reference signal scheme 500 depicts a slot with symbols 0 through 13.

In some examples, a bandwidth for transmission of the CSI-RS 535 (e.g., for an individual CSI-RS transmission) may be the same as a bandwidth of a PSSCH 530 transmission in the same slot.

In some examples, the configuration or selection of the beams 545 may differ in different scenarios. For example, as shown in FIG. 5A, the CSI-RS 535 may be transmitted with a same transmit beam as PSCCH or PSSCH with beam repetition being used for transmission of the CSI-RSs 535 (e.g., in accordance or association with an implicit beam maintenance procedure as described herein).

In FIG. 5B, the reference signal scheme 501 may include one or more symbols for PSCCH 520, one or more symbols for DMRS 525, one or more symbols for PSSCH 530, and one or more symbols for CSI-RS 535. Reference signal scheme 501 depicts a slot with symbols 0 through 13.

In contrast to FIG. 5A, FIG. 5B shows an example in which the CSI-RSs 535 are transmitted with beams different than a beam used for transmission of PSSCH 530, PSCCH 520, or both. In some examples, the CSI-RSs 535 may all be transmitted with a same beam, or, as depicted in FIG. 5B, a UE may transmit the CSI-RSs 535 using a beam sweeping procedure (e.g., in accordance with or in association with an explicit beam maintenance procedure as described herein).

In FIG. 5C, the reference signal scheme 502 may include one or more symbols for PSCCH 520, one or more symbols for DMRS 525, one or more symbols for PSSCH 530, one or more symbols for CSI-RS 535. Portions of one or more symbols may be empty 540 (e.g., in that no information is communicated in such resources). Reference signal scheme 502 depicts a slot with symbols 0 through 13.

In some examples, PSSCH rate matching may be employed. For example, in some cases, CSI-RS 535 tones are transmitted on CSI-RS symbols for beam maintenance and other tones are not transmitted on such symbols. In other words, PSSCH transmissions may be rate-matched around entire CSI-RS 535 symbols. For example, a transmitting UE may sweep different transmit beams on CSI-RS 535 symbols for beam maintenance. Additionally, or alternatively, a receiving UE may sweep different receive beams on CSI-RS 535 symbols for beam maintenance.

In some examples, transmission power of CSI-RS 535 tones may be boosted. For example, the symbols 9, 10, and 12 depicted in FIG. 5C may be transmitted with an increased CSI-RS tone power to maintain a same symbol power used for transmission of other symbols in the slot, as portions of the symbols 9, 10, and 12 are empty 540 (e.g., no information is transmitted in the empty 540 resources). In some examples, the power boosting factor may be expressed as $10*\log_{10}(P)=7.78$ dB. In some examples, the P=6, such as in cases in which two CSI-RS tones are transmitted within a resource block.

Figure 6A:
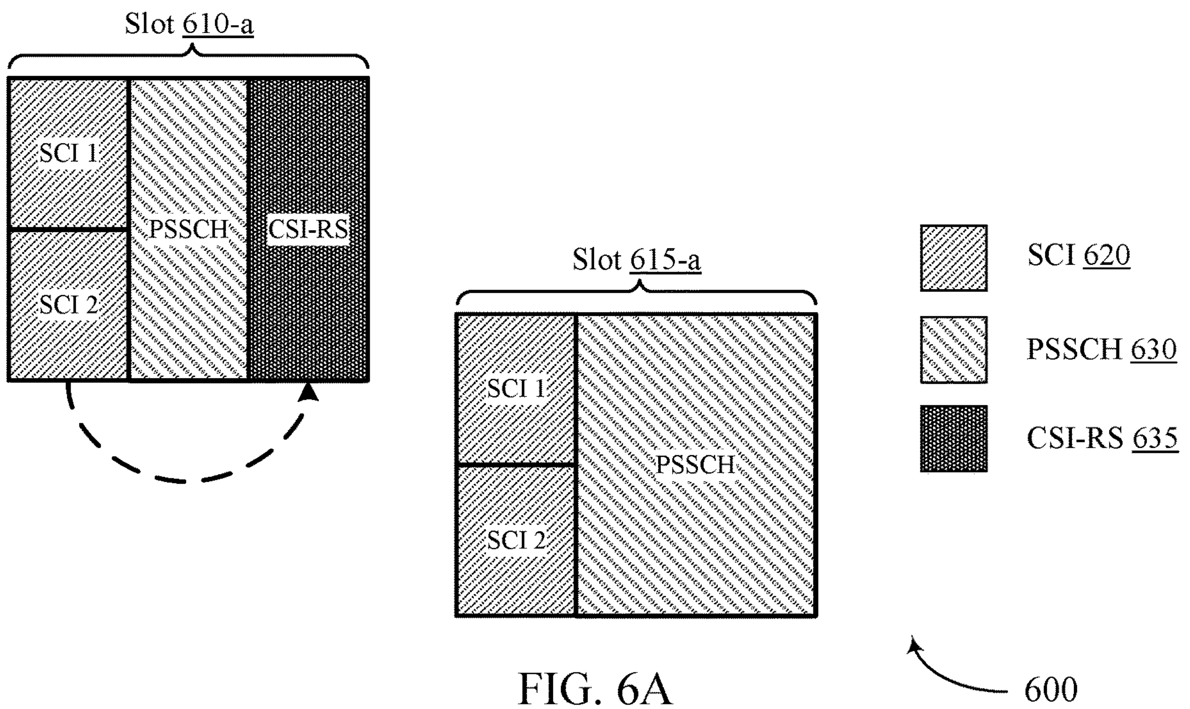
FIGS. 6A and 6B show examples of reference signal schemes that support reference signal configurations for sidelink beam maintenance.
Figure 6B:
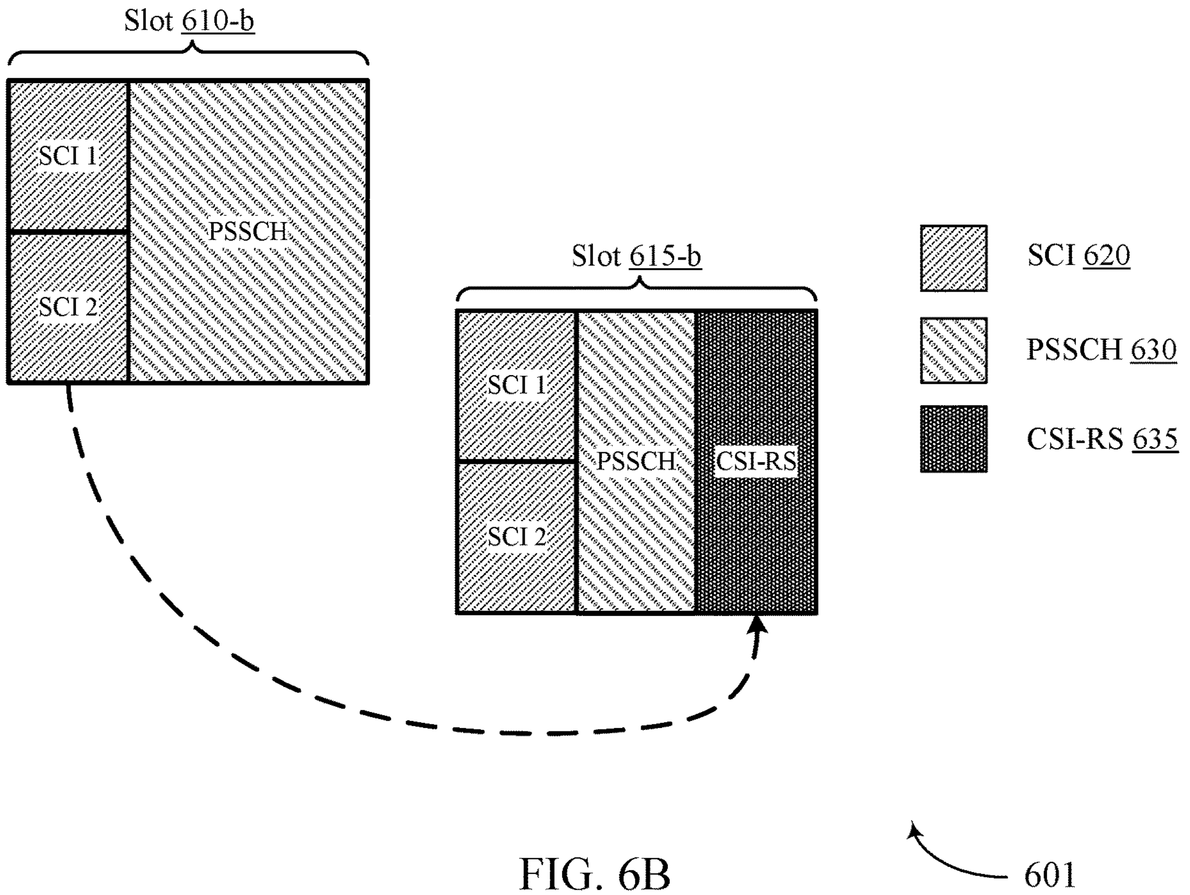

FIGS. 6A and 6B show examples of reference signal scheme 600 and reference signal scheme 601 that support reference signal configurations for sidelink beam maintenance. In some examples, transmission of CSI-RS 635 may be indicated in SCI 620 via an explicit field (e.g., an SCI field) in an SCI transmission (e.g., SCI 2). Various implementations or options of such indications are possible.

In FIG. 6A, slot 610-*a* and slot 615-*a* are depicted. Slot 610-*a* includes two SCI 620 portions for SCI 1 and SCI 2, a portion for transmission of PSSCH 630, and a portion for transmission of CSI-RS 635. Slot 615-*a* includes two SCI 620 portions for SCI 1 and SCI 2 and a portion for transmission of PSSCH 630.

In some examples, the use of explicit beam maintenance with transmit beam sweeping may be employed. In some such examples, a field (e.g., a one bit field) in the SCI 620 (e.g., SCI 2) of slot 610-*a* indicates transmission of the CSI-RS 635 is to occur within the same slot 610-*a*. In such cases, the receiving UE may not change receive beams to receive CSI-RS symbols for beam maintenance (e.g., due to the explicit beam maintenance scheme as described herein).

In FIG. 6B, slot 610-*b* and slot 615-*b* are depicted. Slot 610-*b* includes two SCI 620 portions for SCI 1 and SCI 2. Slot 610-*b* includes a portion for transmission of PSSCH 630. Slot 615-*b* includes two SCI 620 portions for SCI 1 and SCI 2, a portion for transmission of PSSCH 630, and a portion for transmission of CSI-RS 635.

In some examples, the use of implicit beam maintenance with transmit beam repetition may be employed. In some such examples, a field (e.g., a one bit field) in the SCI 620 (e.g., SCI 2) of slot 610-*b* indicates transmission of the CSI-RS 635 is to occur within the next slot 615-*b* (or another slot that is not necessarily the following slot). In such cases, the receiving UE may change receive beams in accordance with the implicit beam maintenance scheme to receive CSI-RS symbols for beam maintenance (e.g., due to the explicit beam maintenance scheme as described herein). By including the extra time (e.g., from slot 610-*b* to slot 615-*b*), the receiving UE may prepare for the receive beam switching that is to occur in the slot 615-*b* based on the trigger in the CSI 2 of the slot 610-*b*.

Figure 7:
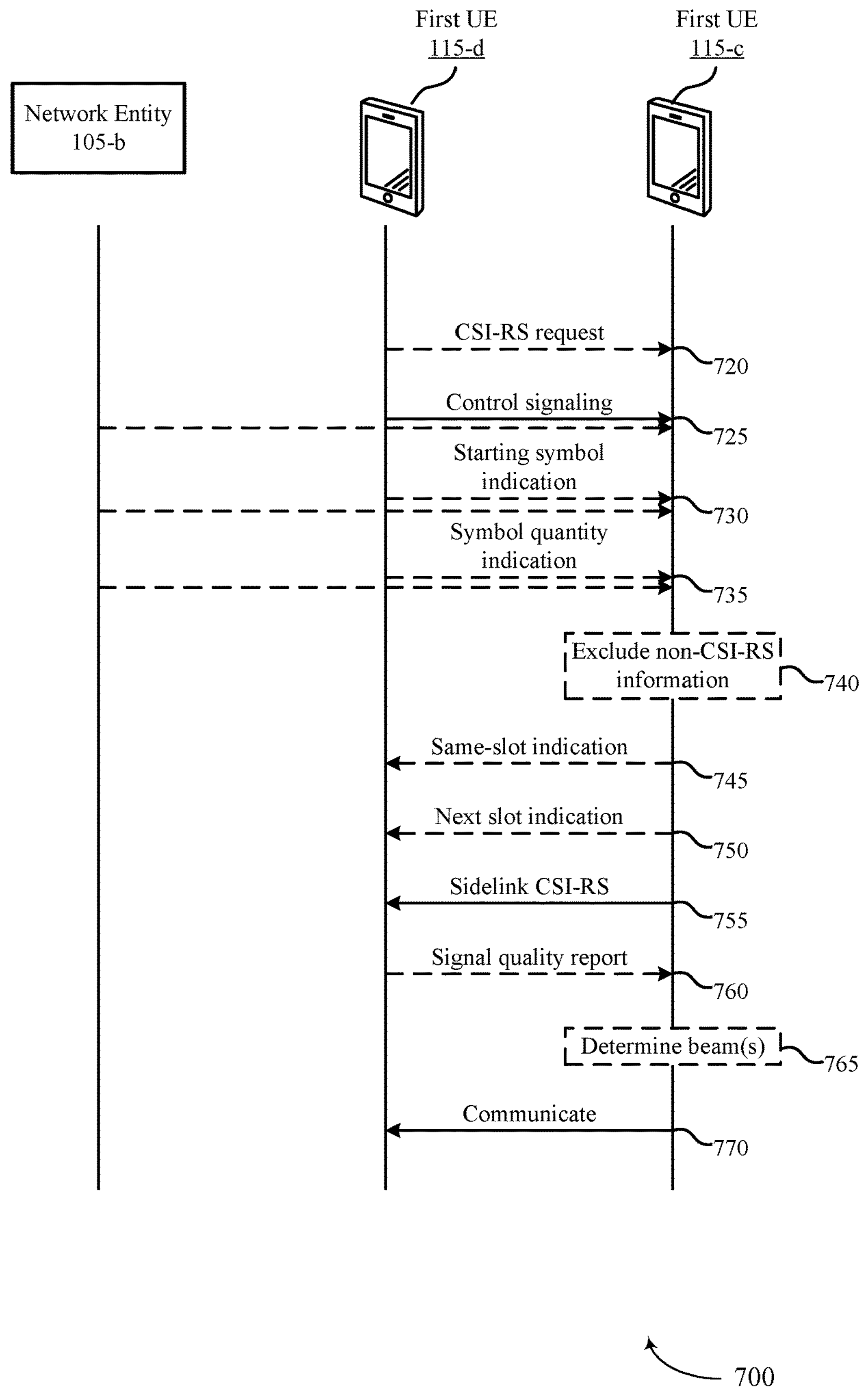
FIG. 7 shows an example of a process flow that supports reference signal configurations for sidelink beam maintenance.

FIG. 7 shows an example of a process flow 700 that supports reference signal configurations for sidelink beam maintenance. The process flow 700 may implement various aspects of the present disclosure described herein. The elements described in the process flow 700 (e.g., first UE 115-*c*, second UE 115-*d*, and network entity 105-*b*) may be examples of similarly named elements described herein.

In the following description of the process flow 700, the operations between the various entities or elements may be performed in different orders or at different times. Some operations may also be left out of the process flow 700, or other operations may be added. Although the various entities or elements are shown performing the operations of the process flow 700, some aspects of some operations may also be performed by other entities or elements of the process flow 700 or by entities or elements that are not depicted in the process flow, or any combination thereof.

At 720, the first UE 115-*c* may receive, in accordance with the sidelink beam management procedure, a request to transmit the sidelink CSI-RS and transmitting the sidelink CSI-RS is based on receiving the request.

At 725, the first UE 115-*c* may receive control signaling indicating a sidelink CSI-RS configuration.

At 730, the first UE 115-*c* may receive an indication of a symbol of the slot that is to be a first symbol of the plurality of non-consecutive symbols.

At 735, the first UE 115-*c* may receive an indication of a quantity of symbols for transmitting the sidelink CSI-RS.

At 740, the first UE 115-*c* may exclude, within symbols in which the sidelink CSI-RS is transmitted, transmission of information other than the sidelink CSI-RS.

At 745, the first UE 115-*c* may transmit, within the slot, control information indicating that the first UE is to transmit the sidelink CSI-RS in the slot.

At 750, the first UE 115-*c* may transmit, in a previous slot occurring earlier in time than the slot, control information indicating that the first UE is to transmit the sidelink CSI-RS in the slot. In some examples, the previous slot and the slot correspond to a same aperiodic resource reservation group.

At 755, the first UE 115-*c* may transmit, in accordance with the sidelink CSI-RS configuration and a sidelink beam management procedure, a sidelink CSI-RS within a slot over a sidelink shared channel. In some examples, to transmit the sidelink CSI-RS, the first UE 115-*c* may transmit, in accordance with the sidelink CSI-RS configuration, the sidelink CSI-RS over a plurality of last consecutive symbols of the slot that precede a gap symbol, and do not overlap with one or more symbols scheduled for DMRS transmissions and one or more symbols scheduled for CSI measurement operations. In some examples, to transmit the sidelink CSI-RS, the first UE 115-*c* may transmit, in accordance with the sidelink CSI-RS configuration, the sidelink CSI-RS over a plurality of non-consecutive symbols of the slot that do not overlap with one or more symbols scheduled for DMRS transmissions and one or more symbols scheduled for CSI measurement operations.

In some examples, to transmit the sidelink CSI-RS, the first UE 115-*c* may transmit the sidelink CSI-RS in accordance with the indication of the first symbol of the plurality of non-consecutive symbols. In some examples, transmitting the sidelink CSI-RS is based on receiving the indication.

In some examples, to transmit the sidelink CSI-RS, the first UE 115-*c* may transmit, in accordance with the sidelink CSI-RS configuration, the sidelink CSI-RS over a plurality of consecutive symbols of the slot that immediately precede a gap symbol and one or more symbols for sidelink shared channel DMRS transmissions are determined based on one or more sidelink shared channel transmissions on symbols excluding the plurality of consecutive symbols for sidelink CSI-RS transmission.

In some examples, to transmit the sidelink CSI-RS, the first UE 115-*c* may transmit the sidelink CSI-RS using a same transmit beam used for transmitting sidelink control channel transmissions, sidelink shared channel transmissions, or both. In some examples, to transmit the sidelink CSI-RS, the first UE 115-*c* may transmit the sidelink CSI-RS using a transmit beam different than transmit beams used for transmitting sidelink control channel transmissions, sidelink shared channel transmissions, or both. In some examples, to transmit the sidelink CSI-RS, the first UE 115-*c* may transmit the sidelink CSI-RS with a transmit power that corresponds to one or more transmit powers associated with symbols other than those in which the sidelink CSI-RS is transmitted. In some examples, a bandwidth of the sidelink CSI-RS is a same bandwidth as a bandwidth of sidelink shared channel information transmitted in the slot.

At 760, the first UE 115-*c* may receive, in accordance with the sidelink beam management procedure, a report indicating one or more signal quality indications associated with the sidelink CSI-RS.

At 765, the first UE 115-*c* may determine, in accordance with the sidelink beam management procedure and the report, one or more beams to be used for communications with the second UE 115-*d*.

At 770, the first UE 115-*c* may communicate with a second UE 115-*d* over the sidelink shared channel in accordance with a result of the sidelink beam management procedure that is based on transmitting the sidelink CSI-RS. In some examples, the first UE 115-*c* may communicate with the second UE 115-*d* based on the determined one or more beams.

Figure 8:
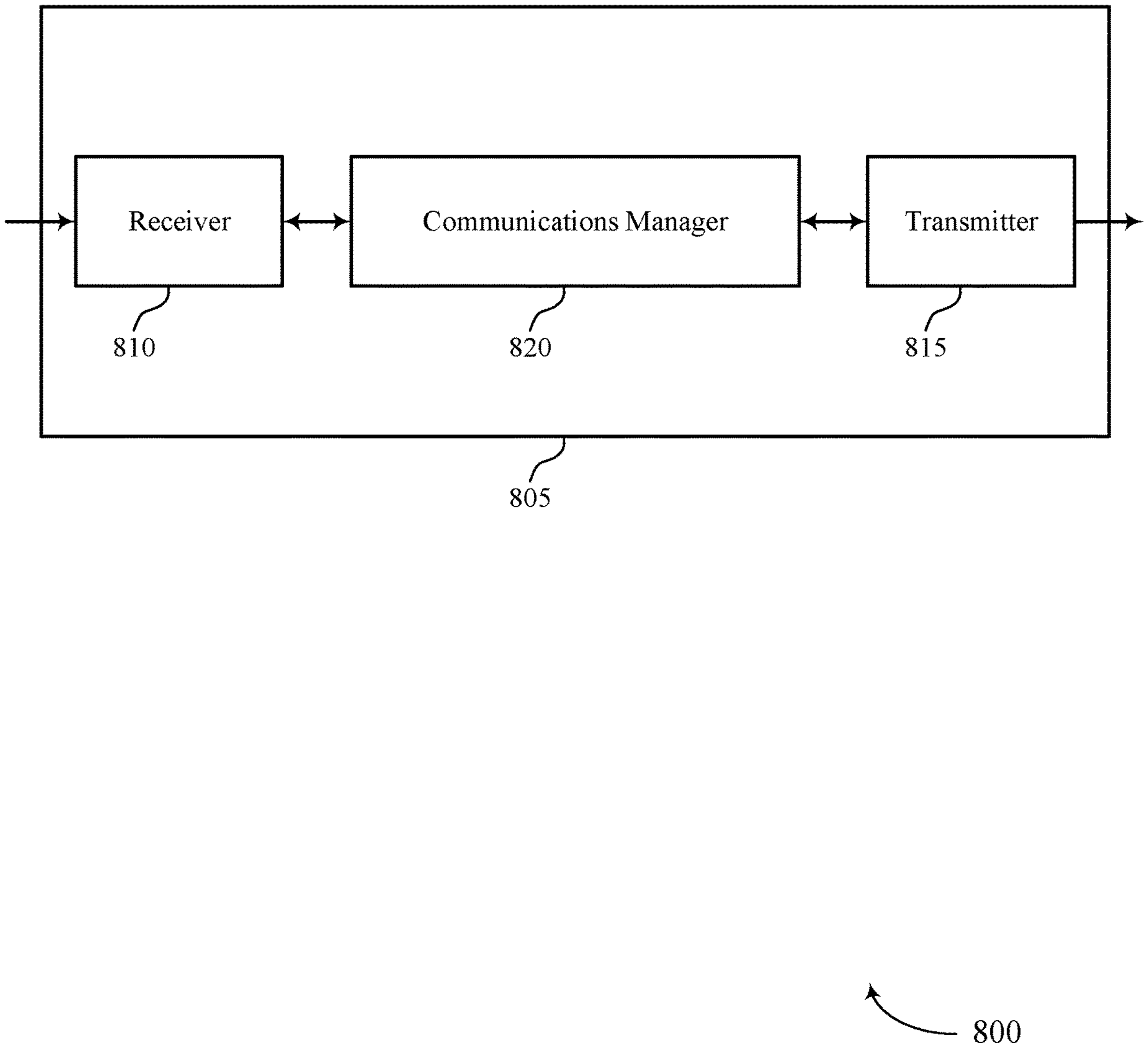
FIGS. 8 and 9 show block diagrams of devices that support reference signal configurations for sidelink beam maintenance.

FIG. 8 shows a block diagram 800 of a device 805 that supports reference signal configurations for sidelink beam maintenance. The device 805 may be an example of aspects of a UE 115 as described herein. The device 805 may include a receiver 810, a transmitter 815, and a communications manager 820. The device 805, or one or more components of the device 805 (e.g., the receiver 810, the transmitter 815, and the communications manager 820), may include at least one processor, which may be coupled with at least one memory, to, individually or collectively, support or enable the described techniques. Each of these components may be in communication with one another (e.g., via one or more buses).

The receiver 810 may provide a means for receiving information such as packets, user data, control information, or any combination thereof associated with various information channels (e.g., control channels, data channels, information channels related to reference signal configurations for sidelink beam maintenance). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to reference signal configurations for sidelink beam maintenance). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of reference signal configurations for sidelink beam maintenance as described herein. For example, the communications manager 820, the receiver 810, the transmitter 815, or various combinations or components thereof may be capable of performing one or more of the functions described herein.

In some examples, the communications manager 820, the receiver 810, the transmitter 815, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 820, the receiver 810, the transmitter 815, or various combinations or components thereof may be implemented in code (e.g., as communications management software or firmware) executed by at least one processor. If implemented in code executed by at least one processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications in accordance with examples as disclosed herein. For example, the communications manager 820 is capable of, configured to, or operable to support a means for receiving control signaling indicating a sidelink CSI-RS configuration. The communications manager 820 is capable of, configured to, or operable to support a means for transmitting, in accordance with the sidelink CSI-RS configuration and a sidelink beam management procedure, a sidelink CSI-RS within a slot over a sidelink shared channel. The communications manager 820 is capable of, configured to, or operable to support a means for communicating with a second UE over the sidelink shared channel in accordance with a result of the sidelink beam management procedure that is based on transmitting the sidelink CSI-RS.

By including or configuring the communications manager 820 in accordance with examples as described herein, the device 805 (e.g., at least one processor controlling or otherwise coupled with the receiver 810, the transmitter 815, the communications manager 820, or a combination thereof) may support techniques for reduced processing, reduced power consumption, more efficient utilization of communication resources, or any combination thereof, due to the reduction in ambiguity in communications involving CSI-RS transmissions.

Figure 9:
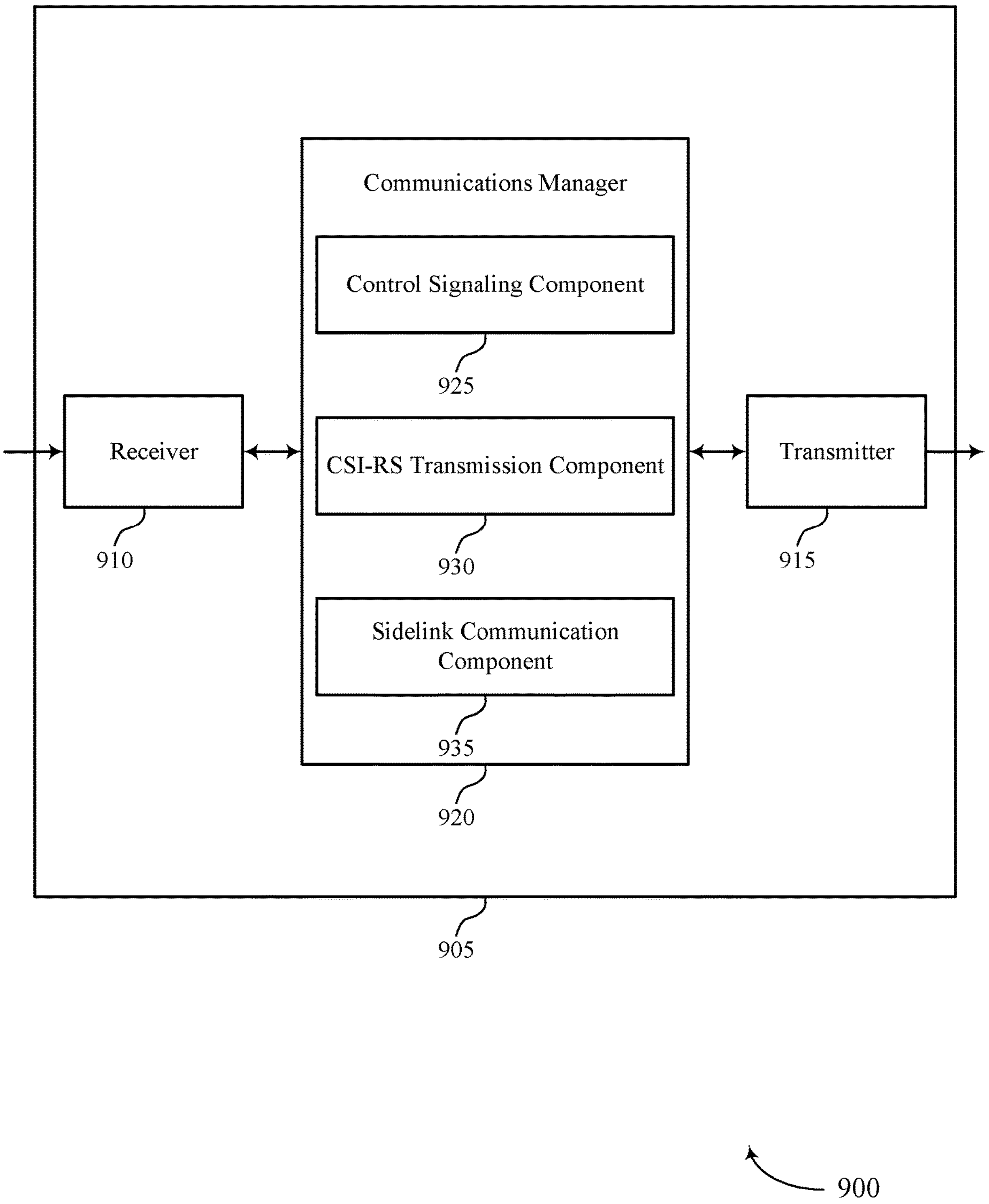

FIG. 9 shows a block diagram 900 of a device 905 that supports reference signal configurations for sidelink beam maintenance. The device 905 may be an example of aspects of a device 805 or a UE 115 as described herein. The device 905 may include a receiver 910, a transmitter 915, and a communications manager 920. The device 905, or one or more components of the device 905 (e.g., the receiver 910, the transmitter 915, and the communications manager 920), may include at least one processor, which may be coupled with at least one memory, to support the described techniques. Each of these components may be in communication with one another (e.g., via one or more buses).

The receiver 910 may provide a means for receiving information such as packets, user data, control information, or any combination thereof associated with various information channels (e.g., control channels, data channels, information channels related to reference signal configurations for sidelink beam maintenance). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to reference signal configurations for sidelink beam maintenance). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of reference signal configurations for sidelink beam maintenance as described herein. For example, the communications manager 920 may include a control signaling component 925, a CSI-RS transmission component 930, a sidelink communication component 935, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications in accordance with examples as disclosed herein. The control signaling component 925 is capable of, configured to, or operable to support a means for receiving control signaling indicating a sidelink CSI-RS configuration. The CSI-RS transmission component 930 is capable of, configured to, or operable to support a means for transmitting, in accordance with the sidelink CSI-RS configuration and a sidelink beam management procedure, a sidelink CSI-RS within a slot over a sidelink shared channel. The sidelink communication component 935 is capable of, configured to, or operable to support a means for communicating with a second UE over the sidelink shared channel in accordance with a result of the sidelink beam management procedure that is based on transmitting the sidelink CSI-RS.

Figure 10:
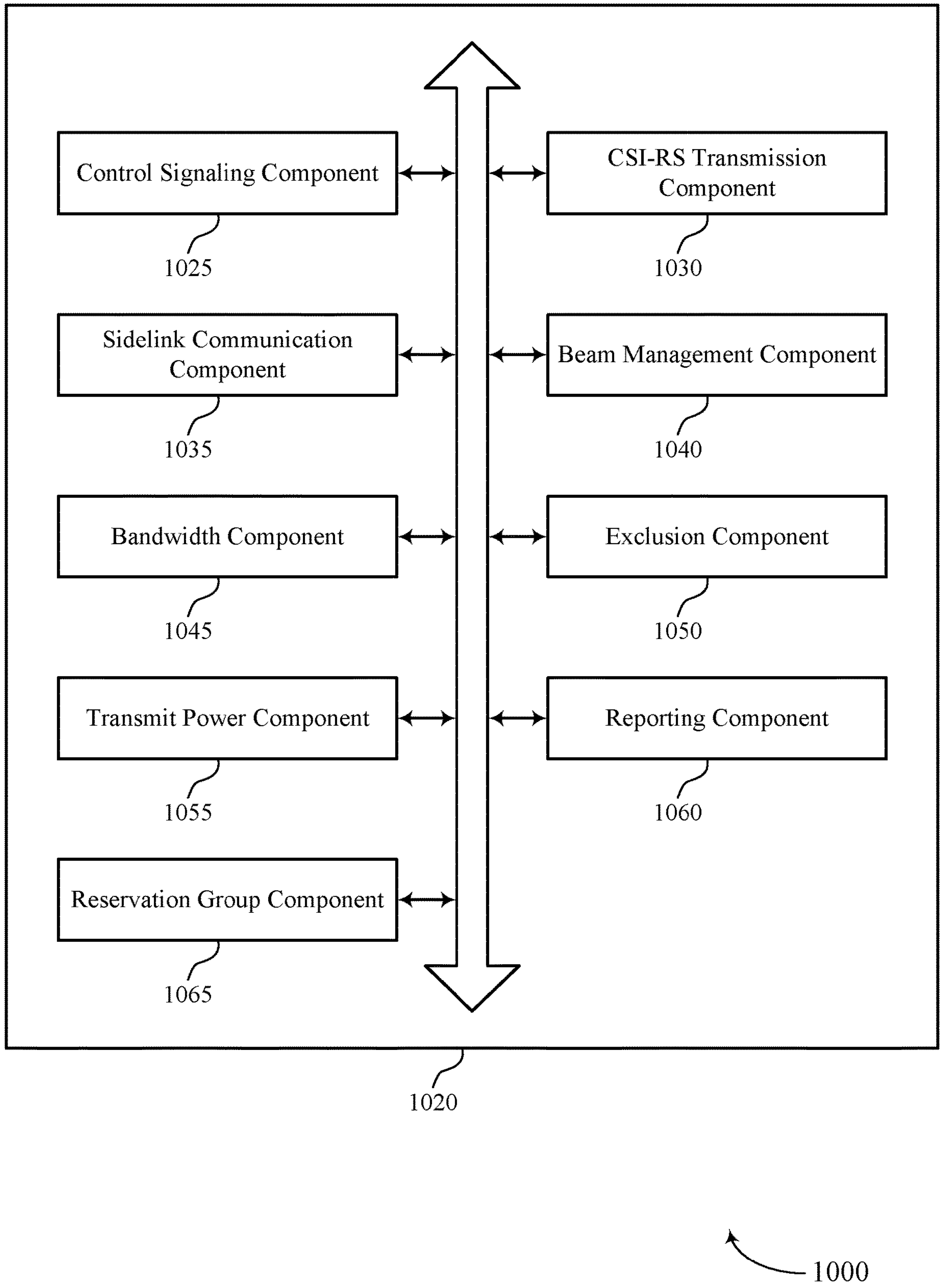
FIG. 10 shows a block diagram of a communications manager that supports reference signal configurations for sidelink beam maintenance.

FIG. 10 shows a block diagram 1000 of a communications manager 1020 that supports reference signal configurations for sidelink beam maintenance. The communications manager 1020 may be an example of aspects of a communications manager 820, a communications manager 920, or both, as described herein. The communications manager 1020, or various components thereof, may be an example of means for performing various aspects of reference signal configurations for sidelink beam maintenance as described herein. For example, the communications manager 1020 may include a control signaling component 1025, a CSI-RS transmission component 1030, a sidelink communication component 1035, a beam management component 1040, a bandwidth component 1045, an exclusion component 1050, a transmit power component 1055, a reporting component 1060, a reservation group component 1065, or any combination thereof. Each of these components, or components or subcomponents thereof (e.g., one or more processors, one or more memories), may communicate, directly or indirectly, with one another (e.g., via one or more buses).

The communications manager 1020 may support wireless communications in accordance with examples as disclosed herein. The control signaling component 1025 is capable of, configured to, or operable to support a means for receiving control signaling indicating a sidelink CSI-RS configuration. The CSI-RS transmission component 1030 is capable of, configured to, or operable to support a means for transmitting, in accordance with the sidelink CSI-RS configuration and a sidelink beam management procedure, a sidelink CSI-RS within a slot over a sidelink shared channel. The sidelink communication component 1035 is capable of, configured to, or operable to support a means for communicating with a second UE over the sidelink shared channel in accordance with a result of the sidelink beam management procedure that is based on transmitting the sidelink CSI-RS.

In some examples, to support transmitting the sidelink CSI-RS, the CSI-RS transmission component 1030 is capable of, configured to, or operable to support a means for transmitting, in accordance with the sidelink CSI-RS configuration, the sidelink CSI-RS over a set of multiple last consecutive symbols of the slot that precede a gap symbol, and do not overlap with one or more symbols scheduled for DMRS transmissions and one or more symbols scheduled for CSI measurement operations.

In some examples, to support transmitting the sidelink CSI-RS, the CSI-RS transmission component 1030 is capable of, configured to, or operable to support a means for transmitting, in accordance with the sidelink CSI-RS configuration, the sidelink CSI-RS over a set of multiple non-consecutive symbols of the slot that do not overlap with one or more symbols scheduled for DMRS transmissions and one or more symbols scheduled for CSI measurement operations.

In some examples, the CSI-RS transmission component 1030 is capable of, configured to, or operable to support a means for receiving an indication of a symbol of the slot that is to be a first symbol of the set of multiple non-consecutive symbols. In some examples, the CSI-RS transmission component 1030 is capable of, configured to, or operable to support a means for transmitting the sidelink CSI-RS, where transmitting the sidelink CSI-RS further includes transmitting the sidelink CSI-RS in accordance with the indication of the first symbol of the set of multiple non-consecutive symbols.

In some examples, the CSI-RS transmission component 1030 is capable of, configured to, or operable to support a means for receiving an indication of a quantity of symbols for transmitting the sidelink CSI-RS, where transmitting the sidelink CSI-RS is based on receiving the indication.

In some examples, to support transmitting the sidelink CSI-RS, the CSI-RS transmission component 1030 is capable of, configured to, or operable to support a means for transmitting, in accordance with the sidelink CSI-RS configuration, the sidelink CSI-RS over a set of multiple consecutive symbols of the slot that immediately precede a gap symbol, where one or more symbols for sidelink shared channel DMRS transmissions are determined based on one or more sidelink shared channel transmissions on symbols excluding the set of multiple consecutive symbols for sidelink CSI-RS transmission.

In some examples, to support transmitting the sidelink CSI-RS, the beam management component 1040 is capable of, configured to, or operable to support a means for transmitting the sidelink CSI-RS using a same transmit beam used for transmitting sidelink control channel transmissions, sidelink shared channel transmissions, or both.

In some examples, to support transmitting the sidelink CSI-RS, the beam management component 1040 is capable of, configured to, or operable to support a means for transmitting the sidelink CSI-RS using a transmit beam different than transmit beams used for transmitting sidelink control channel transmissions, sidelink shared channel transmissions, or both.

In some examples, a bandwidth of the sidelink CSI-RS is a same bandwidth as a bandwidth of sidelink shared channel information transmitted in the slot.

In some examples, the exclusion component 1050 is capable of, configured to, or operable to support a means for excluding, within symbols in which the sidelink CSI-RS is transmitted, transmission of information other than the sidelink CSI-RS.

In some examples, to support transmitting the sidelink CSI-RS, the transmit power component 1055 is capable of, configured to, or operable to support a means for transmitting the sidelink CSI-RS with a transmit power that corresponds to one or more transmit powers associated with symbols other than those in which the sidelink CSI-RS is transmitted.

In some examples, the control signaling component 1025 is capable of, configured to, or operable to support a means for transmitting, within the slot, control information indicating that the first UE is to transmit the sidelink CSI-RS in the slot.

In some examples, the control signaling component 1025 is capable of, configured to, or operable to support a means for transmitting, in a previous slot occurring earlier in time than the slot, control information indicating that the first UE is to transmit the sidelink CSI-RS in the slot.

In some examples, the previous slot and the slot correspond to a same aperiodic resource reservation group.

In some examples, the CSI-RS transmission component 1030 is capable of, configured to, or operable to support a means for receiving, in accordance with the sidelink beam management procedure, a request to transmit the sidelink CSI-RS, where transmitting the sidelink CSI-RS is based on receiving the request.

In some examples, the reporting component 1060 is capable of, configured to, or operable to support a means for receiving, in accordance with the sidelink beam management procedure, a report indicating one or more signal quality indications associated with the sidelink CSI-RS. In some examples, the beam management component 1040 is capable of, configured to, or operable to support a means for determining, in accordance with the sidelink beam management procedure and the report, one or more beams to be used for communications with the second UE, where communicating with the second UE is based on the determined one or more beams.

Figure 11:
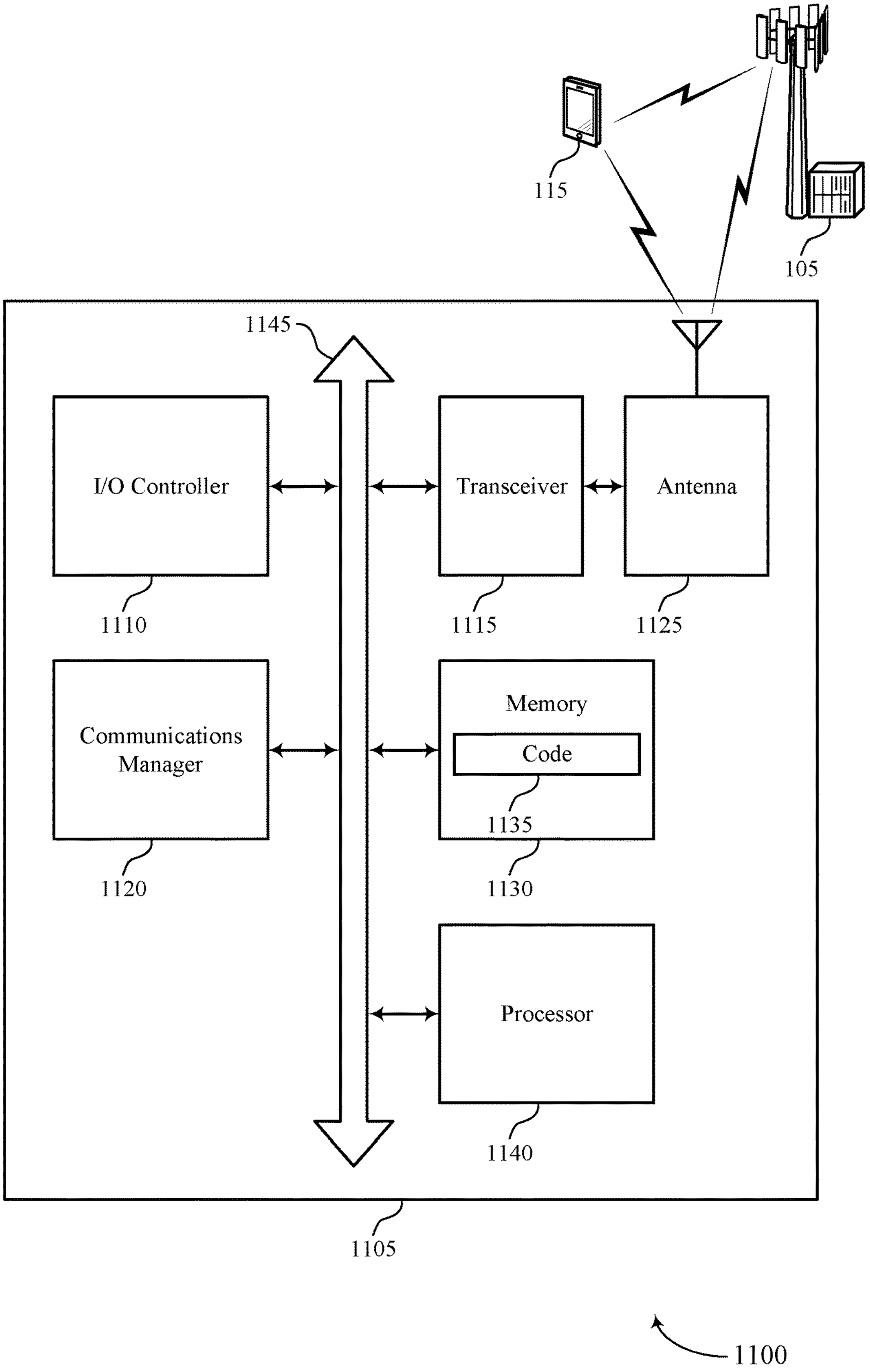
FIG. 11 shows a diagram of a system including a device that supports reference signal configurations for sidelink beam maintenance.

FIG. 11 shows a diagram of a system 1100 including a device 1105 that supports reference signal configurations for sidelink beam maintenance. The device 1105 may be an example of or include the components of a device 805, a device 905, or a UE 115 as described herein. The device 1105 may communicate (e.g., wirelessly) with one or more network entities 105, one or more UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, at least one memory 1130, code 1135, and at least one processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally, or alternatively, the I/O controller 1110 may represent or interact with a modem, a keyboard, a mouse, a touchscreen, or a similar device. In some cases, the I/O controller 1110 may be implemented as part of one or more processors, such as the at least one processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The at least one memory 1130 may include random access memory (RAM) and read-only memory (ROM). The at least one memory 1130 may store computer-readable, computer-executable code 1135 including instructions that, when executed by the at least one processor 1140, cause the device 1105 to perform various functions described herein. The code 1135 may be stored in a non-transitory computer-readable medium such as system memory or another type of memory. In some cases, the code 1135 may not be directly executable by the at least one processor 1140 but may cause a computer (e.g., when compiled and executed) to perform functions described herein. In some cases, the at least one memory 1130 may contain, among other things, a basic I/O system (BIOS) which may control basic hardware or software operation such as the interaction with peripheral components or devices.

The at least one processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 1140 may be configured to operate a memory array using a memory controller. In some other cases, a memory controller may be integrated into the at least one processor 1140. The at least one processor 1140 may be configured to execute computer-readable instructions stored in a memory (e.g., the at least one memory 1130) to cause the device 1105 to perform various functions (e.g., functions or tasks supporting reference signal configurations for sidelink beam maintenance). For example, the device 1105 or a component of the device 1105 may include at least one processor 1140 and at least one memory 1130 coupled with or to the at least one processor 1140, the at least one processor 1140 and at least one memory 1130 configured to perform various functions described herein. In some examples, the at least one processor 1140 may include multiple processors and the at least one memory 1130 may include multiple memories. One or more of the multiple processors may be coupled with one or more of the multiple memories, which may, individually or collectively, be configured to perform various functions herein. In some examples, the at least one processor 1140 may be a component of a processing system, which may refer to a system (such as a series) of machines, circuitry (including, for example, one or both of processor circuitry (which may include the at least one processor 1140) and memory circuitry (which may include the at least one memory 1130)), or components, that receives or obtains inputs and processes the inputs to produce, generate, or obtain a set of outputs. The processing system may be configured to perform one or more of the functions described herein. For example, the at least one processor 1140 or a processing system including the at least one processor 1140 may be configured to, configurable to, or operable to cause the device 1105 to perform one or more of the functions described herein. Further, as described herein, being "configured to," being "configurable to," and being "operable to" may be used interchangeably and may be associated with a capability, when executing code stored in the at least one memory 1130 or otherwise, to perform one or more of the functions described herein.

The communications manager 1120 may support wireless communications in accordance with examples as disclosed herein. For example, the communications manager 1120 is capable of, configured to, or operable to support a means for receiving control signaling indicating a sidelink CSI-RS configuration. The communications manager 1120 is capable of, configured to, or operable to support a means for transmitting, in accordance with the sidelink CSI-RS configuration and a sidelink beam management procedure, a sidelink CSI-RS within a slot over a sidelink shared channel. The communications manager 1120 is capable of, configured to, or operable to support a means for communicating with a second UE over the sidelink shared channel in accordance with a result of the sidelink beam management procedure that is based on transmitting the sidelink CSI-RS.

By including or configuring the communications manager 1120 in accordance with examples as described herein, the device 1105 may support techniques for improved communication reliability, reduced latency, improved user experience related to reduced processing, reduced power consumption, more efficient utilization of communication resources, improved coordination between devices, longer battery life, improved utilization of processing capability, or any combination thereof, due to the reduction in ambiguity in communications involving CSI-RS transmissions.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the at least one processor 1140, the at least one memory 1130, the code 1135, or any combination thereof. For example, the code 1135 may include instructions executable by the at least one processor 1140 to cause the device 1105 to perform various aspects of reference signal configurations for sidelink beam maintenance as described herein, or the at least one processor 1140 and the at least one memory 1130 may be otherwise configured to, individually or collectively, perform or support such operations.

Figure 12:
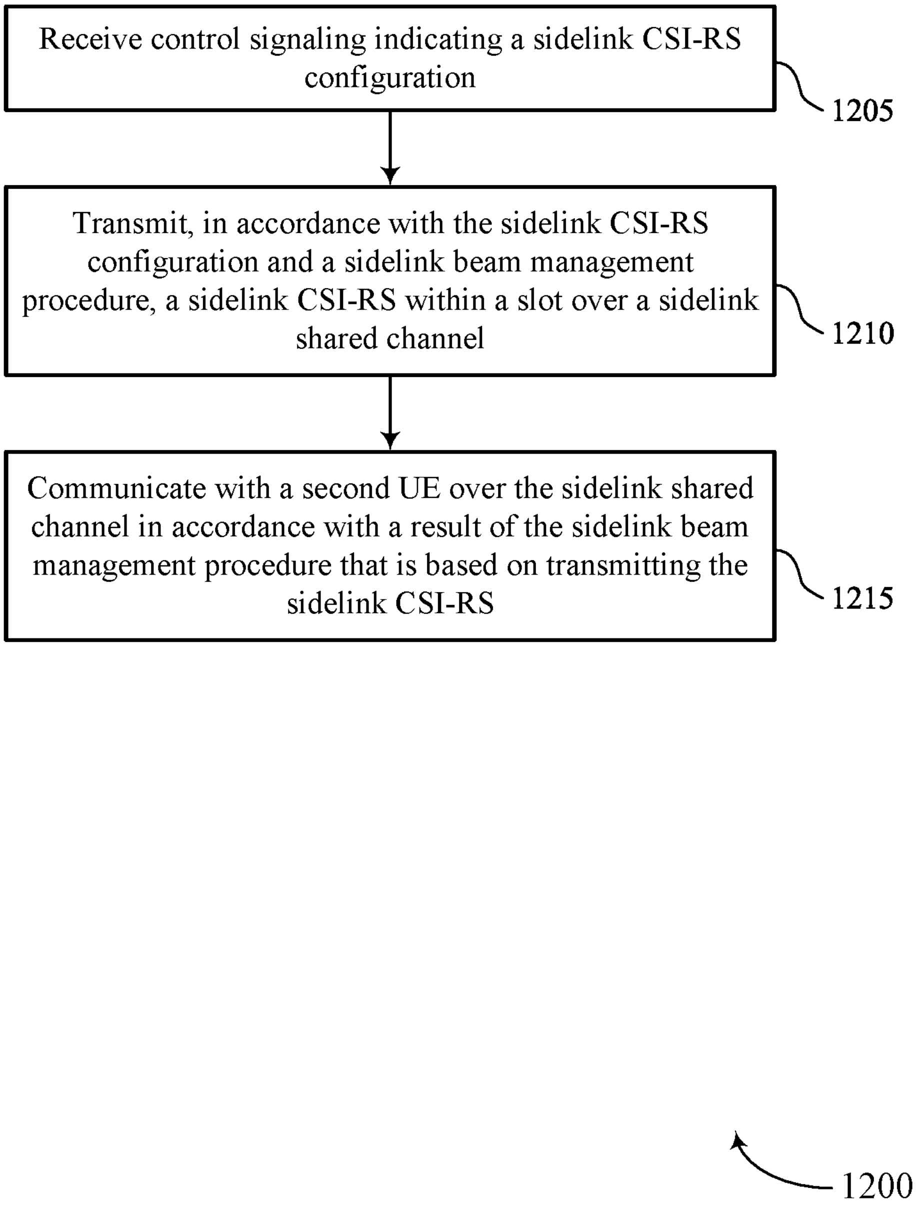
FIGS. 12 through 15 show flowcharts illustrating methods that support reference signal configurations for sidelink beam maintenance.

FIG. 12 shows a flowchart illustrating a method 1200 that supports reference signal configurations for sidelink beam maintenance. The operations of the method 1200 may be implemented by a UE or its components as described herein. For example, the operations of the method 1200 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1205, the method may include receiving control signaling indicating a sidelink CSI-RS configuration. The operations of block 1205 may be performed in accordance with examples as disclosed herein. In some examples, aspects of the operations of 1205 may be performed by a control signaling component 1025 as described with reference to FIG. 10.

At 1210, the method may include transmitting, in accordance with the sidelink CSI-RS configuration and a sidelink beam management procedure, a sidelink CSI-RS within a slot over a sidelink shared channel. The operations of block 1210 may be performed in accordance with examples as disclosed herein. In some examples, aspects of the operations of 1210 may be performed by a CSI-RS transmission component 1030 as described with reference to FIG. 10.

At 1215, the method may include communicating with a second UE over the sidelink shared channel in accordance with a result of the sidelink beam management procedure that is based on transmitting the sidelink CSI-RS. The operations of block 1215 may be performed in accordance with examples as disclosed herein. In some examples, aspects of the operations of 1215 may be performed by a sidelink communication component 1035 as described with reference to FIG. 10.

Figure 13:
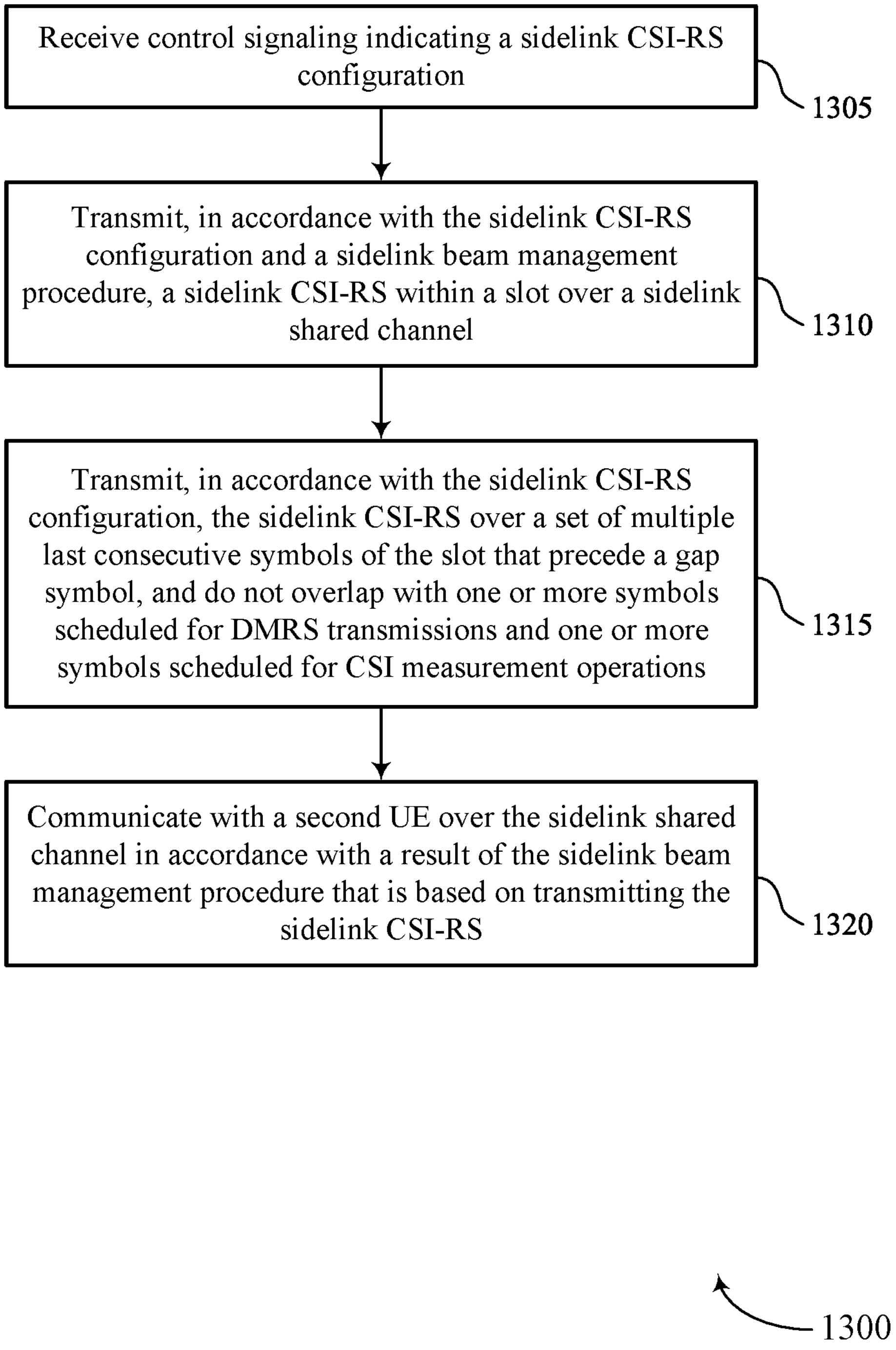

FIG. 13 shows a flowchart illustrating a method 1300 that supports reference signal configurations for sidelink beam maintenance. The operations of the method 1300 may be implemented by a UE or its components as described herein. For example, the operations of the method 1300 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1305, the method may include receiving control signaling indicating a sidelink CSI-RS configuration. The operations of block 1305 may be performed in accordance with examples as disclosed herein. In some examples, aspects of the operations of 1305 may be performed by a control signaling component 1025 as described with reference to FIG. 10.

At 1310, the method may include transmitting, in accordance with the sidelink CSI-RS configuration and a sidelink beam management procedure, a sidelink CSI-RS within a slot over a sidelink shared channel, where transmitting the sidelink CSI-RS includes transmitting, in accordance with the sidelink CSI-RS configuration, the sidelink CSI-RS over a set of multiple last consecutive symbols of the slot that precede a gap symbol, and do not overlap with one or more symbols scheduled for DMRS transmissions and one or more symbols scheduled for CSI measurement operations. The operations of block 1310 may be performed in accordance with examples as disclosed herein. In some examples, aspects of the operations of 1310 may be performed by a CSI-RS transmission component 1030 as described with reference to FIG. 10.

At 1315, the method may include communicating with a second UE over the sidelink shared channel in accordance with a result of the sidelink beam management procedure that is based on transmitting the sidelink CSI-RS. The operations of block 1320 may be performed in accordance with examples as disclosed herein. In some examples, aspects of the operations of 1320 may be performed by a sidelink communication component 1035 as described with reference to FIG. 10.

Figure 14:
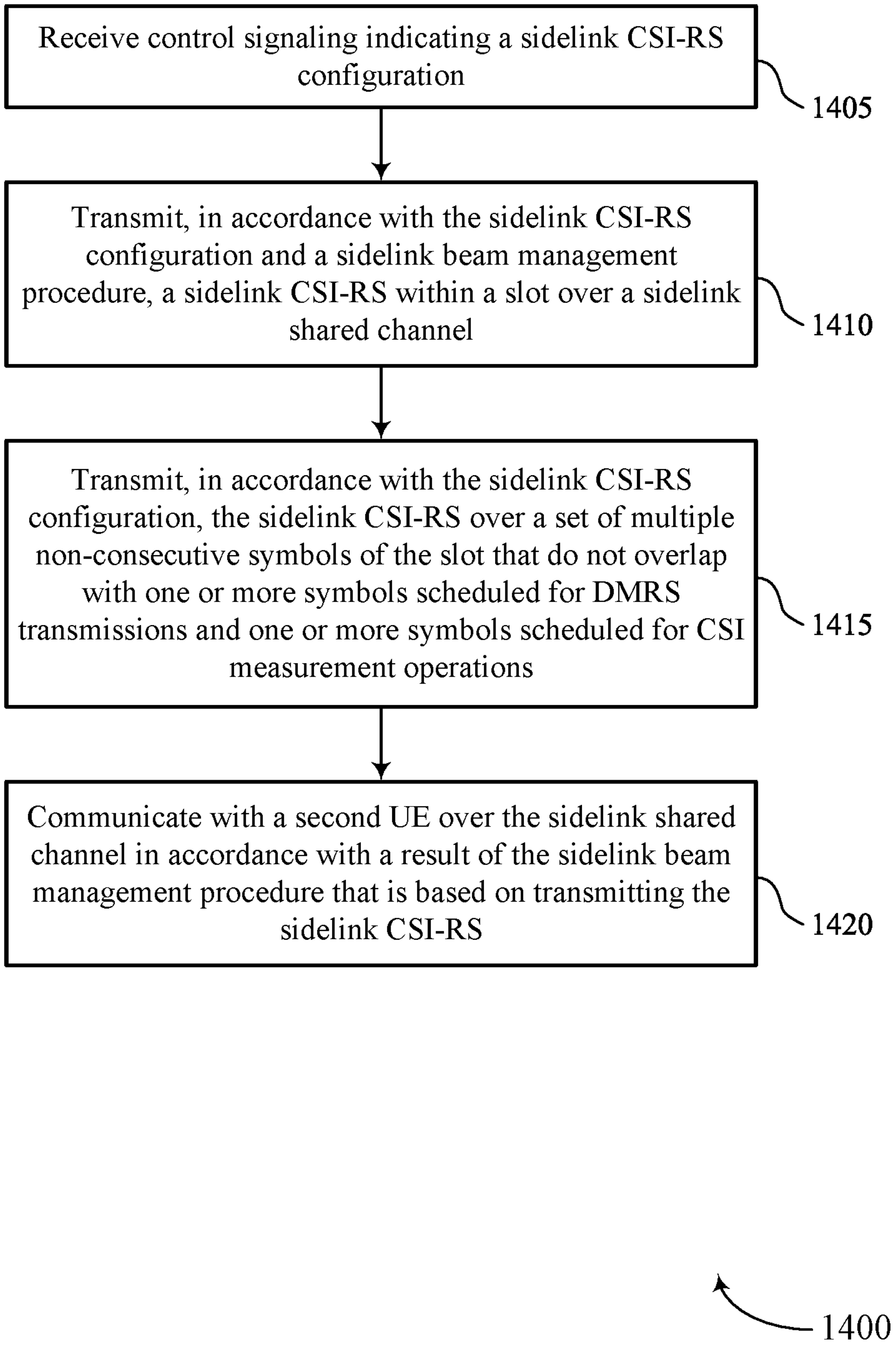

FIG. 14 shows a flowchart illustrating a method 1400 that supports reference signal configurations for sidelink beam maintenance. The operations of the method 1400 may be implemented by a UE or its components as described herein. For example, the operations of the method 1400 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1405, the method may include receiving control signaling indicating a sidelink CSI-RS configuration. The operations of block 1405 may be performed in accordance with examples as disclosed herein. In some examples, aspects of the operations of 1405 may be performed by a control signaling component 1025 as described with reference to FIG. 10.

At 1410, the method may include transmitting, in accordance with the sidelink CSI-RS configuration and a sidelink beam management procedure, a sidelink CSI-RS within a slot over a sidelink shared channel, where transmitting the sidelink CSI-RS includes transmitting, in accordance with the sidelink CSI-RS configuration, the sidelink CSI-RS over a set of multiple non-consecutive symbols of the slot that do not overlap with one or more symbols scheduled for DMRS transmissions and one or more symbols scheduled for CSI measurement operations. The operations of block 1410 may be performed in accordance with examples as disclosed herein. In some examples, aspects of the operations of 1410 may be performed by a CSI-RS transmission component 1030 as described with reference to FIG. 10.

At 1415, the method may include communicating with a second UE over the sidelink shared channel in accordance with a result of the sidelink beam management procedure that is based on transmitting the sidelink CSI-RS. The operations of block 1420 may be performed in accordance with examples as disclosed herein. In some examples, aspects of the operations of 1420 may be performed by a sidelink communication component 1035 as described with reference to FIG. 10.

Figure 15:
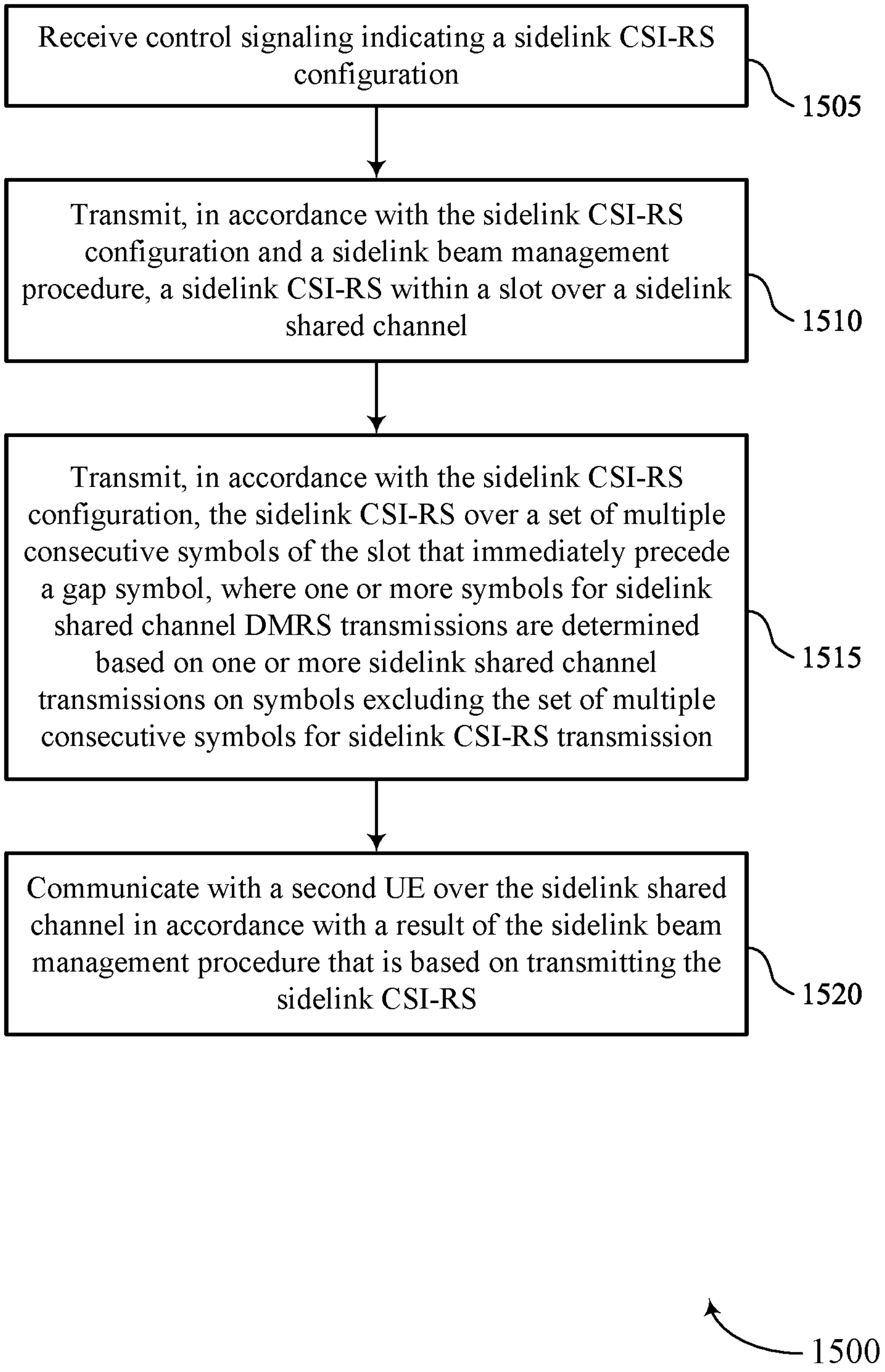

FIG. 15 shows a flowchart illustrating a method 1500 that supports reference signal configurations for sidelink beam maintenance. The operations of the method 1500 may be implemented by a UE or its components as described herein. For example, the operations of the method 1500 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1505, the method may include receiving control signaling indicating a sidelink CSI-RS configuration. The operations of block 1505 may be performed in accordance with examples as disclosed herein. In some examples, aspects of the operations of 1505 may be performed by a control signaling component 1025 as described with reference to FIG. 10.

At 1510, the method may include transmitting, in accordance with the sidelink CSI-RS configuration and a sidelink beam management procedure, a sidelink CSI-RS within a slot over a sidelink shared channel, where transmitting the sidelink CSI-RS includes transmitting, in accordance with the sidelink CSI-RS configuration, the sidelink CSI-RS over a set of multiple consecutive symbols of the slot that immediately precede a gap symbol, where one or more symbols for sidelink shared channel DMRS transmissions are determined based on one or more sidelink shared channel transmissions on symbols excluding the set of multiple consecutive symbols for sidelink CSI-RS transmission. The operations of block 1510 may be performed in accordance with examples as disclosed herein. In some examples, aspects of the operations of 1510 may be performed by a CSI-RS transmission component 1030 as described with reference to FIG. 10.

At 1515, the method may include communicating with a second UE over the sidelink shared channel in accordance with a result of the sidelink beam management procedure that is based on transmitting the sidelink CSI-RS. The operations of block 1520 may be performed in accordance with examples as disclosed herein. In some examples, aspects of the operations of 1520 may be performed by a sidelink communication component 1035 as described with reference to FIG. 10.

The Following Provides an Overview of Aspects of the Present Disclosure:

Aspect 1: A method for wireless communications at a first UE, comprising: receiving control signaling indicating a sidelink CSI reference signal (CSI-RS) configuration; transmitting, in accordance with the sidelink CSI-RS configuration and a sidelink beam management procedure, a sidelink CSI-RS within a slot over a sidelink shared channel; and communicating with a second UE over the sidelink shared channel in accordance with a result of the sidelink beam management procedure that is based at least in part on transmitting the sidelink CSI-RS.

Aspect 2: The method of aspect 1, wherein transmitting the sidelink CSI-RS further comprises: transmitting, in accordance with the sidelink CSI-RS configuration, the sidelink CSI-RS over a plurality of last consecutive symbols of the slot that precede a gap symbol, and do not overlap with one or more symbols scheduled for DMRS transmissions and one or more symbols scheduled for CSI measurement operations.

Aspect 3: The method of any of aspects 1 through 2, wherein transmitting the sidelink CSI-RS further comprises: transmitting, in accordance with the sidelink CSI-RS configuration, the sidelink CSI-RS over a plurality of non-consecutive symbols of the slot that do not overlap with one or more symbols scheduled for DMRS transmissions and one or more symbols scheduled for CSI measurement operations.

Aspect 4: The method of aspect 3, further comprising: receiving an indication of a symbol of the slot that is to be a first symbol of the plurality of non-consecutive symbols; wherein transmitting the sidelink CSI-RS further comprises transmitting the sidelink CSI-RS in accordance with the indication of the first symbol of the plurality of non-consecutive symbols.

Aspect 5: The method of any of aspects 1 through 4, further comprising: receiving an indication of a quantity of symbols for transmitting the sidelink CSI-RS, wherein transmitting the sidelink CSI-RS is based at least in part on receiving the indication.

Aspect 6: The method of any of aspects 1 through 5, wherein transmitting the sidelink CSI-RS further comprises: transmitting, in accordance with the sidelink CSI-RS configuration, the sidelink CSI-RS over a plurality of consecutive symbols of the slot that immediately precede a gap symbol, wherein one or more symbols for sidelink shared channel DMRS transmissions are determined based at least in part on one or more sidelink shared channel transmissions on symbols excluding the plurality of consecutive symbols for sidelink CSI-RS transmission.

Aspect 7: The method of any of aspects 1 through 6, wherein transmitting the sidelink CSI-RS further comprises: transmitting the sidelink CSI-RS using a same transmit beam used for transmitting sidelink control channel transmissions, sidelink shared channel transmissions, or both.

Aspect 8: The method of any of aspects 1 through 7, wherein transmitting the sidelink CSI-RS further comprises: transmitting the sidelink CSI-RS using a transmit beam different than transmit beams used for transmitting sidelink control channel transmissions, sidelink shared channel transmissions, or both.

Aspect 9: The method of any of aspects 1 through 8, wherein a bandwidth of the sidelink CSI-RS is a same bandwidth as a bandwidth of sidelink shared channel information transmitted in the slot.

Aspect 10: The method of any of aspects 1 through 9, further comprising: excluding, within symbols in which the sidelink CSI-RS is transmitted, transmission of information other than the sidelink CSI-RS.

Aspect 11: The method of any of aspects 1 through 10, wherein transmitting the sidelink CSI-RS further comprises: transmitting the sidelink CSI-RS with a transmit power that corresponds to one or more transmit powers associated with symbols other than those in which the sidelink CSI-RS is transmitted.

Aspect 12: The method of any of aspects 1 through 11, further comprising: transmitting, within the slot, control information indicating that the first UE is to transmit the sidelink CSI-RS in the slot.

Aspect 13: The method of any of aspects 1 through 12, further comprising: transmitting, in a previous slot occurring earlier in time than the slot, control information indicating that the first UE is to transmit the sidelink CSI-RS in the slot.

Aspect 14: The method of aspect 13, wherein the previous slot and the slot correspond to a same aperiodic resource reservation group.

Aspect 15: The method of any of aspects 1 through 14, further comprising: receiving, in accordance with the sidelink beam management procedure, a request to transmit the sidelink CSI-RS, wherein transmitting the sidelink CSI-RS is based at least in part on receiving the request.

Aspect 16: The method of any of aspects 1 through 15, further comprising: receiving, in accordance with the sidelink beam management procedure, a report indicating one or more signal quality indications associated with the sidelink CSI-RS; and determining, in accordance with the sidelink beam management procedure and the report, one or more beams to be used for communications with the second UE, wherein communicating with the second UE is based at least in part on the determined one or more beams.

Aspect 17: A first UE for wireless communications, comprising one or more memories storing processor-executable code, and one or more processors coupled with the one or more memories and individually or collectively operable to execute the code to cause the first UE to perform a method of any of aspects 1 through 16.

Aspect 18: A first UE for wireless communications, comprising at least one means for performing a method of any of aspects 1 through 16.

Aspect 19: A non-transitory computer-readable medium storing code for wireless communications, the code comprising instructions executable by one or more processors to perform a method of any of aspects 1 through 16.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first user equipment (UE), comprising:

one or more memories storing processor-executable code; and one or more processors coupled with the one or more memories and individually or collectively operable to execute the code to cause the first UE to:

receive control signaling indicating a sidelink channel state information (CSI) reference signal (CSI-RS) configuration;

transmit, in accordance with the sidelink CSI-RS configuration and a sidelink beam management procedure, a sidelink CSI-RS within a plurality of consecutive symbols of a slot that precede a gap symbol that is a last symbol of the slot over a sidelink shared channel; and communicate with a second UE over the sidelink shared channel in accordance with a result of the sidelink beam management procedure that is based at least in part on transmitting the sidelink CSI-RS.

2. The first UE of claim 1, wherein:

the plurality of consecutive symbols do not overlap with one or more symbols scheduled for demodulation reference signal (DMRS) transmissions and one or more symbols scheduled for CSI measurement operations.

3. The first UE of claim 1, wherein the one or more processors are individually or collectively further operable to execute the code to cause the first UE to:

receive an indication of a symbol of the slot that is to be a first symbol of a plurality of non-consecutive symbols;

wherein transmitting the sidelink CSI-RS further comprises transmitting the sidelink CSI-RS in accordance with the indication of the first symbol of the plurality of non-consecutive symbols.

4. The first UE of claim 1, wherein the one or more processors are individually or collectively further operable to execute the code to cause the first UE to:

receive an indication of a quantity of symbols for transmitting the sidelink CSI-RS, wherein transmitting the sidelink CSI-RS is based at least in part on receiving the indication.

5. The first UE of claim 1, wherein:

one or more symbols for sidelink shared channel demodulation reference signal (DMRS) transmissions are determined based at least in part on one or more sidelink shared channel transmissions on symbols excluding the plurality of consecutive symbols for sidelink CSI-RS transmission.

6. The first UE of claim 1, wherein, to transmit the sidelink CSI-RS, the one or more processors are individually or collectively further operable to execute the code to cause the first UE to:

transmit the sidelink CSI-RS using a same transmit beam used for transmitting sidelink control channel transmissions, sidelink shared channel transmissions, or both.

7. The first UE of claim 1, wherein, to transmit the sidelink CSI-RS, the one or more processors are individually or collectively further operable to execute the code to cause the first UE to:

transmit the sidelink CSI-RS using a transmit beam different than transmit beams used for transmitting sidelink control channel transmissions, sidelink shared channel transmissions, or both.

8. The first UE of claim 1, wherein a bandwidth of the sidelink CSI-RS is a same bandwidth as a bandwidth of sidelink shared channel information transmitted in the slot.

9. The first UE of claim 1, wherein the one or more processors are individually or collectively further operable to execute the code to cause the first UE to:

exclude, within symbols in which the sidelink CSI-RS is transmitted, transmission of information other than the sidelink CSI-RS.

10. The first UE of claim 1, wherein, to transmit the sidelink CSI-RS, the one or more processors are individually or collectively further operable to execute the code to cause the first UE to:

transmit the sidelink CSI-RS with a transmit power that corresponds to one or more transmit powers associated with symbols other than those in which the sidelink CSI-RS is transmitted.

11. The first UE of claim 1, wherein the one or more processors are individually or collectively further operable to execute the code to cause the first UE to:

transmit, within the slot, control information indicating that the first UE is to transmit the sidelink CSI-RS in the slot.

12. The first UE of claim 1, wherein the one or more processors are individually or collectively further operable to execute the code to cause the first UE to:

transmit, in a previous slot occurring earlier in time than the slot, control information indicating that the first UE is to transmit the sidelink CSI-RS in the slot.

13. The first UE of claim 12, wherein the previous slot and the slot correspond to a same aperiodic resource reservation group.

14. The first UE of claim 1, wherein the one or more processors are individually or collectively further operable to execute the code to cause the first UE to:

receive, in accordance with the sidelink beam management procedure, a request to transmit the sidelink CSI-RS, wherein transmitting the sidelink CSI-RS is based at least in part on receiving the request.

15. The first UE of claim 1, wherein the one or more processors are individually or collectively further operable to execute the code to cause the first UE to:

receive, in accordance with the sidelink beam management procedure, a report indicating one or more signal quality indications associated with the sidelink CSI-RS; and determine, in accordance with the sidelink beam management procedure and the report, one or more beams to be used for communications with the second UE, wherein communicating with the second UE is based at least in part on the determined one or more beams.

16. A method for wireless communications at a first user equipment (UE), comprising:

receiving control signaling indicating a sidelink channel state information (CSI) reference signal (CSI-RS) configuration;

transmitting, in accordance with the sidelink CSI-RS configuration and a sidelink beam management procedure, a sidelink CSI-RS within a plurality of consecutive symbols of a slot that precede a gap symbol that is a last symbol of the slot over a sidelink shared channel; and communicating with a second UE over the sidelink shared channel in accordance with a result of the sidelink beam management procedure that is based at least in part on transmitting the sidelink CSI-RS.

17. The method of claim 16, wherein:

the plurality of consecutive symbols do not overlap with one or more symbols scheduled for demodulation reference signal (DMRS) transmissions and one or more symbols scheduled for CSI measurement operations.

18. The method of claim 16, wherein:

one or more symbols for sidelink shared channel demodulation reference signal (DMRS) transmissions are determined based at least in part on one or more sidelink shared channel transmissions on symbols excluding the plurality of consecutive symbols for sidelink CSI-RS transmission.

19. A first user equipment (UE) for wireless communications, comprising:

means for receiving control signaling indicating a sidelink channel state information (CSI) reference signal (CSI-RS) configuration;

means for transmitting, in accordance with the sidelink CSI-RS configuration and a sidelink beam management procedure, a sidelink CSI-RS within a plurality of consecutive symbols of a slot that precede a gap symbol that is a last symbol of the slot a slot over a sidelink shared channel; and means for communicating with a second UE over the sidelink shared channel in accordance with a result of the sidelink beam management procedure that is based at least in part on transmitting the sidelink CSI-RS.

* * * * *